United States Patent
Carr et al.

(10) Patent No.: US 10,748,146 B2
(45) Date of Patent: Aug. 18, 2020

(54) TAMPER-RESISTANT SECURE METHODS, SYSTEMS AND APPARATUSES FOR CREDIT AND DEBIT TRANSACTIONS

(75) Inventors: Robert O. Carr, New London, NH (US); Steve Elefant, Lafayette, CA (US); Sarah McCrary, Addison, TX (US); Paul Minutillo, Allen, TX (US)

(73) Assignee: HEARTLAND PAYMENT SYSTEMS, LLC, Atlanta, GA (US)

( * ) Notice: Subject to any disclaimer, the term of this patent is extended or adjusted under 35 U.S.C. 154(b) by 2025 days.

(21) Appl. No.: 12/816,356

(22) Filed: Jun. 15, 2010

(65) Prior Publication Data
US 2010/0318468 A1    Dec. 16, 2010

Related U.S. Application Data

(60) Provisional application No. 61/187,660, filed on Jun. 16, 2009.

(51) Int. Cl.
*G06Q 20/00* (2012.01)
*G06Q 20/40* (2012.01)
*G06Q 20/02* (2012.01)
*G06Q 20/38* (2012.01)
*G06Q 20/20* (2012.01)

(52) U.S. Cl.
CPC .......... *G06Q 20/40* (2013.01); *G06Q 20/027* (2013.01); *G06Q 20/20* (2013.01); *G06Q 20/3823* (2013.01)

(58) Field of Classification Search
CPC ... G06Q 20/40; G06Q 20/027; G06Q 20/3823
USPC ................ 705/79, 66, 71; 380/277
See application file for complete search history.

(56) References Cited

U.S. PATENT DOCUMENTS

| 4,797,920 A | * | 1/1989 | Stein ............................. 705/72 |
| 5,448,638 A | * | 9/1995 | Johnson et al. ............... 705/72 |
| 5,638,445 A | * | 6/1997 | Spelman ............. G06Q 20/085 380/283 |

(Continued)

OTHER PUBLICATIONS

Sausner, R. "The Battle to Secure Tomorrow—Ten security innovations with the power to make a difference" Bank Technology News, vol. 2, No. 9, Sep. 2009, SourceMedia, Inc., New York, New York, USA.

*Primary Examiner* — Patrick McAtee
*Assistant Examiner* — John M Winter
(74) *Attorney, Agent, or Firm* — Leffler Intellectual Property Law, PLLC; Kenneth B. Leffler

(57) ABSTRACT

An electronic payment transaction involves operating a gateway device in an electronic payment system to receive first encrypted transaction data from a merchant device, wherein the first encrypted transaction data is encrypted by means of a merchant device-specific encrypting key. Decrypted transaction data is produced by using a merchant device-specific decrypting key to decrypt the first encrypted transaction data. Second encrypted transaction data is derived from the decrypted transaction data, wherein the second encrypted transaction data is encrypted by means of a gateway device-specific encrypting key. The gateway device communicates the second encrypted transaction data to another electronic payment system server. A key transmission block received from the merchant device includes information that enables the gateway device to derive the merchant device-specific decryption key.

6 Claims, 11 Drawing Sheets

(56) References Cited

U.S. PATENT DOCUMENTS

| | | | |
|---|---|---|---|
| 5,790,410 A * | 8/1998 | Warn et al. | 700/232 |
| 5,790,677 A * | 8/1998 | Fox et al. | 705/78 |
| 5,978,840 A * | 11/1999 | Nguyen | G06Q 20/00 |
| | | | 705/53 |
| 6,128,391 A * | 10/2000 | Denno et al. | 380/283 |
| 6,675,153 B1 * | 1/2004 | Cook et al. | 705/74 |
| 7,506,812 B2 | 3/2009 | von Mueller et al. | |
| 7,725,404 B2 * | 5/2010 | Sellars et al. | 705/76 |
| 2004/0029569 A1 * | 2/2004 | Khan et al. | 455/414.1 |
| 2005/0204128 A1 * | 9/2005 | Aday et al. | 713/152 |
| 2006/0173794 A1 * | 8/2006 | Sellars et al. | 705/76 |
| 2007/0133797 A1 * | 6/2007 | Schipper | G06Q 20/1235 |
| | | | 380/231 |
| 2007/0294182 A1 * | 12/2007 | Hammad | 705/64 |
| 2008/0103982 A1 * | 5/2008 | Hammad et al. | 705/66 |
| 2008/0109372 A1 * | 5/2008 | Bykov et al. | 705/71 |
| 2010/0135498 A1 * | 6/2010 | Long | H04L 9/0866 |
| | | | 380/278 |
| 2010/0153273 A1 * | 6/2010 | Sellars et al. | 705/67 |

* cited by examiner

TAMPER-RESISTANT SECURE METHODS, SYSTEMS AND APPARATUSES FOR CREDIT AND DEBIT TRANSACTIONS

CROSS REFERENCE TO RELATED APPLICATIONS

This application claims the benefit of U.S. Provisional Application No. 61/187,660, filed Jun. 16, 2009, which is hereby incorporated herein by reference in its entirety.

BACKGROUND

The present invention relates to methods and systems that enable products and services to be purchased by means of electronic payment transactions, such as by means of credit and debit card transactions, and more particularly to methods and apparatuses that protect the data communicated in such transactions against unauthorized access.

The electronic payment industry, which includes the performance of electronic credit and debit transactions, has been in existence for decades. Over this time, protocols and processes have been established to suit the unique transaction requirements of the electronic payment industry. Initially, point-to-point communication methodologies were employed. With the advent of the Internet, additional modifications and capabilities have been provided to make it possible to advantageously utilize this resource to the benefit of the electronic payment industry.

Despite these improvements with advancing technology over the decades, one aspect of electronic payments that has remained relatively unaddressed is the security of sensitive information. A number of exposures have existed, including the communication of sensitive information in an unencrypted form (so-called "cleartext"), that create opportunities for dishonest parties to obtain such information without authorization and potentially use it in criminal ways. Yet it is not a simple task to solve the many technical problems presented when trying to add a layer of security to existing electronic payment architectures.

It is therefore desired to provide methods and apparatuses that address the weaknesses in present electronic payment systems and provide secure ways of handling sensitive information.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that perform electronic payment transactions. This involves operating a gateway device to receive first encrypted transaction data from a merchant device, wherein the first encrypted transaction data is encrypted by means of a merchant device-specific encrypting key. The gateway device produces decrypted transaction data by using a merchant device-specific decrypting key to decrypt the first encrypted transaction data. The gateway device derives second encrypted transaction data from at least a portion of the decrypted transaction data, wherein the second encrypted transaction data is encrypted by means of a host-specific encrypting key. The gateway device communicates the second encrypted transaction data to another host device.

In another aspect of some embodiments, performing an electronic payment transaction involves operating the gateway device to receive a key transmission block from the merchant device, wherein the key transmission block includes an encrypted copy of the merchant device-specific decrypting key and one or more key-related parameters. The gateway device uses the one or more key-related parameters to derive a decrypting key that is associated with the gateway device. The decrypting key is used to decrypt the encrypted copy of the merchant device-specific decrypting key, thereby making the merchant device-specific decrypting key available for use in the step of using the merchant device-specific decrypting key to decrypt the first encrypted transaction data.

In some embodiments, the decrypting key associated with the gateway device is an asymmetric private key of the gateway device.

In some, but not necessarily all embodiments, the merchant device-specific encrypting key is the same as the merchant device-specific decrypting key (i.e., a symmetric key is used).

In another aspect of embodiments consistent with the invention, performing an electronic payment transaction comprises operating a merchant device to receive sensitive user data. The merchant device forms encrypted sensitive user data by encrypting the sensitive user data using a merchant device-specific encrypting key. Encrypted transaction data is formed, wherein the encrypted transaction data includes the encrypted sensitive user data. An encrypting key associated with a gateway device of an electronic payment system is used to encrypt a merchant device-specific decrypting key. A key transmission block is formed, wherein the key transmission block comprises the encrypted merchant device-specific decrypting key. The encrypted transaction data and the key transmission block are then communicated to the gateway device of the electronic payment system.

In still other aspects of some embodiments, the merchant device-specific encrypting key is the same as the merchant device-specific decrypting key.

In yet other aspects of some embodiments, the encrypting key associated with the gateway device of the electronic payment system is an asymmetric key.

In still other aspects of some embodiments, performing the electronic payment transaction further includes forming encrypted sensitive non-user data by encrypting sensitive non-user data using the merchant device-specific encrypting key, and the encrypted transaction data further includes the encrypted sensitive non-user data.

In yet other aspects of some embodiments, the sensitive non-user data includes a merchant identifier.

In still other aspects of some embodiments, a system for the performance of an electronic payment transaction comprises a gateway device and a host device. The gateway device is configured to receive a first encrypted transaction data and a key transmission block from a merchant device, the first encrypted transaction data produced by encrypting transaction data with a merchant device-specific encrypting key and the key transmission block including an encrypted copy of a merchant device-specific decrypting key and one or more key related parameters. The gateway device is further configured to produce a decrypted transaction data by using an associated private key derived, at least in part, from the one or more key related parameters, to decrypt the encrypted copy of the merchant device-specific decrypting key, wherein the gateway device produces a second encrypted transaction data by encrypting the decrypted transaction data using a gateway device-specific key and is configured to transmit the second encrypted transaction data. The host device is configured to receive and use the second encrypted transaction data for the performance of credit transaction processing operations, wherein the host device is configured to produce and store a second decrypted transaction data derived by decrypting the second encrypted transaction data and to transmit at least one of the second encrypted transaction data and the second decrypted transaction data.

In an aspect of some of these embodiments, the host device is further configured to use a host encrypting key to produce third encrypted data from the second decrypted transaction data, wherein the third encrypted data can be decrypted by means of a host decrypting key. The host device is further configured to use an encrypting key associated with an authorization/settlement server to encrypt the host decrypting key and to include the encrypted host decrypting key in a second key transmission block. The host device is still further configured to communicate the third encrypted data and the second key transmission block to the authorization/settlement server.

BRIEF DESCRIPTION OF THE DRAWINGS

The objects and advantages of the invention will be understood by reading the following detailed description in conjunction with the drawings in which.

DETAILED DESCRIPTION

Figure 1:
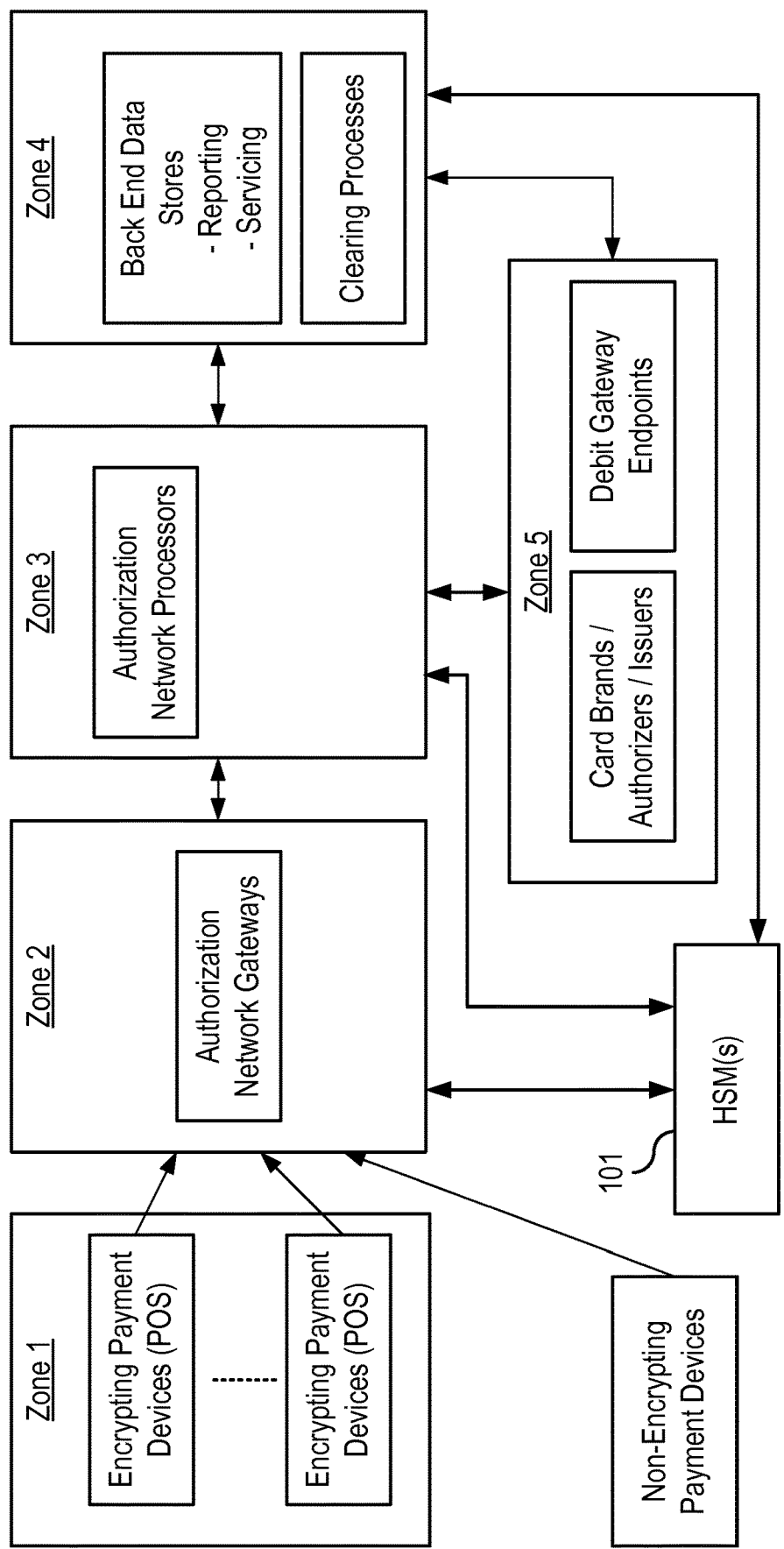
FIG. 1 is a block diagram of payment zones implemented in an End to End Model for securing sensitive information in an electronic credit and debit transaction system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

It will further be understood that the term "model" is used herein to mean a schematic description of a tangible system that serves as an exemplar from which the various aspects of the invention can be appreciated by those of ordinary skill in the art. The headers used to identify various sections within the instant application are not intended and should not be interpreted to limit the invention claimed and described herein. Those of ordinary skill in the art will readily appreciate that many alternative arrangements can be devised that, although they differ from one another in one or more ways, are all nonetheless compliant with the system model disclosed herein.

1. The End to End Encryption Security Model

In order to achieve the desired level of security, an End to End Encryption Security Model provides for protection of sensitive payment account and processing data from unauthorized access, and especially renders data inaccessible or worthless if improperly accessed.

The model includes deploying:
Data encryption to render data worthless if improperly accessed,
Tamper Resistant Security Modules (TRSMs) on encrypting devices to protect cryptographic secrets,
Hardware Security Modules (HSMs—a type of TRSM) within the implementing entity's processing network for protecting cryptographic secrets,
Physical access protections on devices to make data inaccessible to unauthorized users,
Authentication of device applications to ensure only authorized applications can process payment transactions on an encrypting device to the implementing entity's processing network.

Reference has been made to an "implementing entity." This is in recognition that electronic payment systems are typically designed and built by companies such as, but not limited to, Heartland Payment Systems™. It is further recognized that such systems must sometimes interact and provide compatible interfaces to/from components designed and/or built by other entities (i.e., entities that are not the implementing entity). In this document, these other entities are hereinafter referred to as "outside entities".

To be complete, the model relies on the security procedures inherent to business operations such as:

The implementing entity's Payments' Network and Server Security and Controls
The implementing entity's Software Assurance and Controls
The implementing entity's Data Center Physical Access Security and Controls
Device Manufacture's Security and Controls

1.1. Scope of Protection

Sensitive payment account and processing data (collectively referred to herein as "transaction information") is protected. Transaction information includes, but is not limited to any one or combination of:

Payment Account Numbers (PANs) of both Credit and Debit accounts, read from a magnetic card stripe or manually entered, Track 1 and Track 2 magnetic stripe data (which includes the PAN, Expiration Date, Service Code, and Issuer Discretionary data) of both Credit and Debit accounts, Other data elements that are sensitive to the implementing entity's payment card processing operations but not necessarily payment card data, for example the Merchant ID.

1.2. End to End Concept

The End to End Encryption Security Model described herein applies encryption to the components of the "end to end" flow that are directly within the control of the implementing entity's processing. For those components that exist outside of the implementing entity's control, such as authorization processing and settlement processing, it is contemplated that, in some embodiments, encryption protection be applied to the communication channels, where data level encryption is not utilized, and to the data where the capabilities exist to make such forms of communication an available means of exchanging data such that the actors that control these processes (e.g., outside entities) accept encryption of sensitive payment account data.

1.3. Application of Encryption in the End to End Encryption Security Model?

Encryption and encryption techniques are well-known in the art. Information to be protected (in the context of the exemplary embodiments described herein, the transaction information) is referred to as "plaintext" or "cleartext". Protection is achieved by applying an algorithm (called a "cipher") to the plaintext to transform the plaintext into an encrypted form in which the underlying information is unreadable to anyone or thing that lacks the special knowledge (referred to as a "key") that is needed to recover the plaintext from the encrypted form.

The End to End Encryption security model requires transforming sensitive payment account and processing data using encryption as near to the origin of the data as possible; and then continuing to protect the data as it flows through the implementing entity's processing platforms.

The End to End model employs encryption to protect data "in-flight" and data "at-rest". Data "in-flight" is data that passes between systems in the processing flow. Data "at-rest" refers to stored information, usually as a result of processing activity.

The End to End Model illustrates the inter-relationship of the end to end components that employ encryption to protect sensitive payment account data, and divides the end to end system into "Payment Zones".

1.4. The Payment Zones

Payment Zones refer to the computing operations and processes that operate under the same encryption parameters. The payment zones implemented in the End to End Model are illustrated in FIG. 1.

The End to End Model is partitioned into five zones of encryption in the payments cycle, as follows:

Zone 1: Data entry/card swipe at the merchant device to the authorization network gateways;
Zone 2: Authorization network gateways;
Zone 3: All points in which data is in motion within the computing network(s) of the processor;
Zone 4: Back-end data stores that support servicing and reporting. (Data at Rest)
Zone 5: From the processor to the authorization center of the brand or issuer for authorization and settlement.

Whenever a transaction moves from one zone to another, it is passed through a dedicated ciphering module, for example a Hardware Security Module 101 or a Tamper Resistant Security Module, to be decrypted upon receipt and then re-encrypted for further transmission or storage.

The following sections describe additional aspects of each Payment Zone within the End to End Encryption Security Model, and describe exemplary embodiments for implementing the Payment Zones.

2. Payment Zone 1: Securing Data from the Point of Entry

2.1. Devices that Read Sensitive Information (e.g., Magnetic Stripe Data or Accept Manual PAN Entry)

There exist different types of devices that accept sensitive information from users. These include Magnetic Stripe Readers (MSRs), Manual PAN entry devices, contact Integrated Circuit (IC) card readers compliant with EMV Chip and pin standards, and also contactless (e.g., Near Field Communication—"NFC") data readers. In order to facilitate readability of this description, references to "Magnetic Stripe Readers" and "Magnetic Stripe Data" are made. As used herein, however, these terms shall be construed to cover any device, such as but not limited to those mentioned above, that receives sensitive information. For such devices that read, for example, payment card magnetic stripe data and support encryption, the End to End Security Model requires at a minimum:

The full, unencrypted Payment Account Number should not be accessible to the payment application and must never be transmitted from the device in plain text.

The device should employ a Tamper Resistant Security Module (a crypto engine that turns card data into enciphered bits) with active detection of tampering and responses that protect encryption keys when tampering is attempted.

Physical protection of data lines between the magnetic stripe reader (MSR) and a Tamper Resistant Security Module (TRSM) should be included that responds to any such attempt to capture data transmitted from the MSR to the TRSM by provoking an active response that wipes encryption key data from the device's secure processor and renders the device non-functional Or Encryption of magnetic stripe data at the MSR head such that data is never in the clear after being read from the card.

Devices that allow manual Payment Account Number (PAN) entry should utilize a secure PIN Pad for PAN entry. The device must not permit the payment application to control key presses received by the PIN pad during the manual entry of the PAN. A device's PIN pad must be controlled by the Operating System (OS) during the manual entry of a PAN.

2.2. Payment Application Middleware

Payment application software implemented on a personal computer does not share the inherent physical security of a device designed specifically for the payment processing.

For payment application software implemented on a personal computer, such as creates a virtual payment terminal, the End to End Security Model requires at a minimum:

The full, unencrypted Payment Account Number must not be accessible to the payment application and must never be transmitted from the payment application to the host in plain text.

Or

Encryption of magnetic stripe data at the MSR head such that data is never in the clear after being read from the card.

Figure 2:
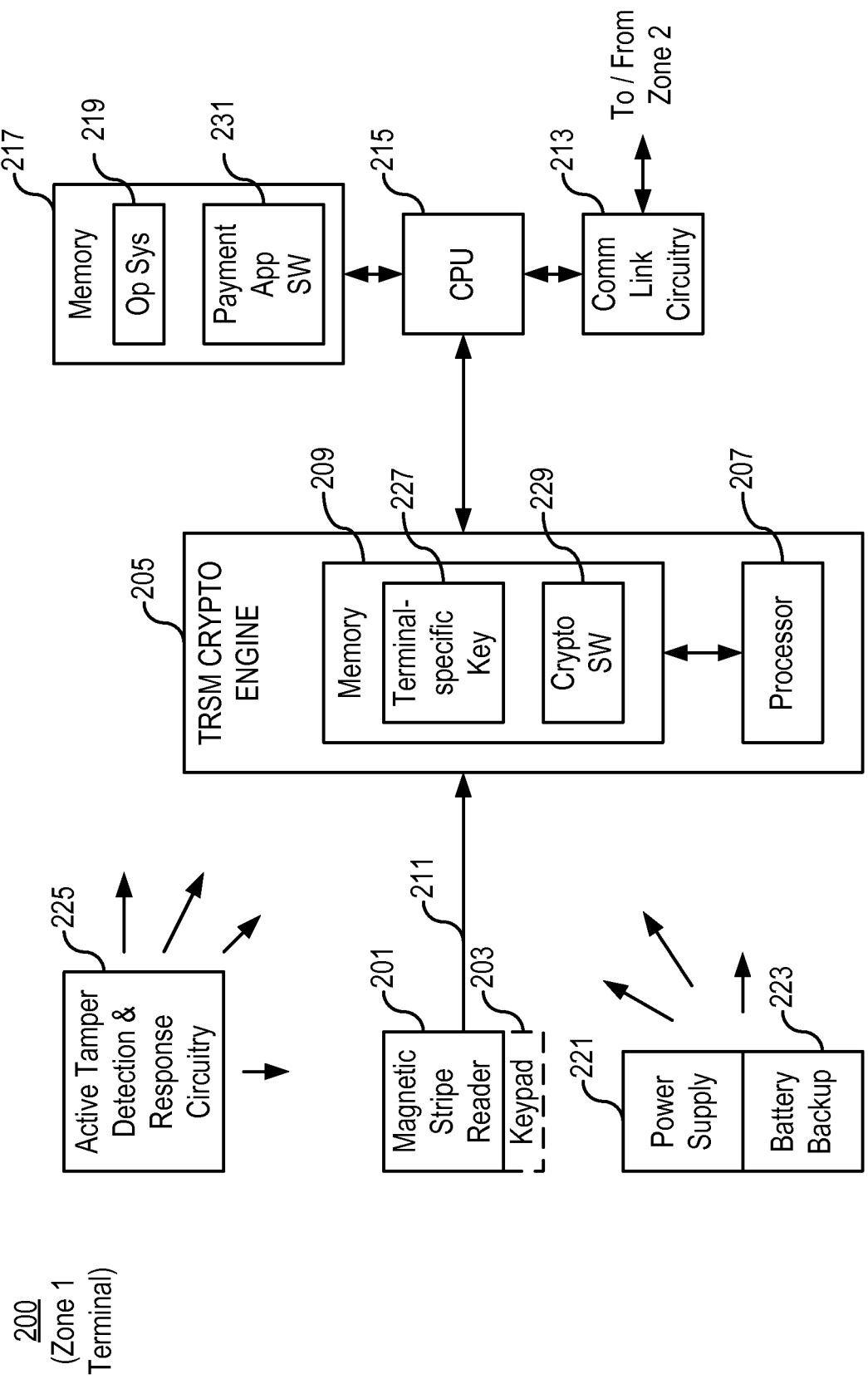
FIG. 2 a block diagram illustrating an exemplary Zone 1 terminal in accordance with aspects of the invention.

Thus, in accordance with aspects of embodiments consistent with the invention, an exemplary Zone 1 terminal 200 (e.g., a Point Of Sale (POS) terminal or other merchant terminal/device) suitable for use in embodiments of the End to End model includes the following elemental classes of components as illustrated in the block diagram FIG. 2:

1. Magstripe reader (MSR) heads and assembly (collectively "magstripe assembly") 201. Other payment method interfaces, contactless, manual entry for example (e.g., as exemplified by the optional keypad 203), are included in this class, and can be used instead of or as a supplement to magstripe reader heads and assembly. To facilitate the description, all references to magstripe readers and or magstripe assemblies should be construed broadly to mean any one or combination of these suitable interfaces.

2. A TRSM crypto engine 205, comprising a processor 207 coupled to a memory 209.

3. A communications link 211 connected at one end to the MSR 201 and at another end to the TRSM crypto engine 205.

4. Communication link circuitry 213, coupled to a zone 1 terminal processor 215 (see below) for providing one or more communications links to the outside world (e.g., dial-up and IP modules).

5. The zone 1 terminal processor 215 (e.g., central processing unit—"CPU"), memory 217 (coupled to the processor 215 to enable the processor 215 to store data into, and retrieve data from, the memory 217) and an operating system 219 (in this embodiment stored in the memory 217, although in other embodiments a separate memory could be provided for this storage).

6. Power supply 221 and battery backup 223.

7. Active tamper detection circuitry 225 for monitoring all of the zone 1 terminal's elements, from the magstripe assembly 201, the communications link 211 between the magstripe reader 201 and the TRSM crypto engine 205 to the outbound communication link circuitry 213. The active tamper detection circuitry 225 also monitors the integrity of the entire package of the zone 1 terminal as well as its components. The active tamper detection circuitry 225 detects physical and electronic tampering. If it detects tampering, the active tamper detection circuitry 225 causes the Zone 1 terminal 200 to wipe out its keys and crypto secrets in order to render the zone 1 terminal inoperable.

Figure 3:
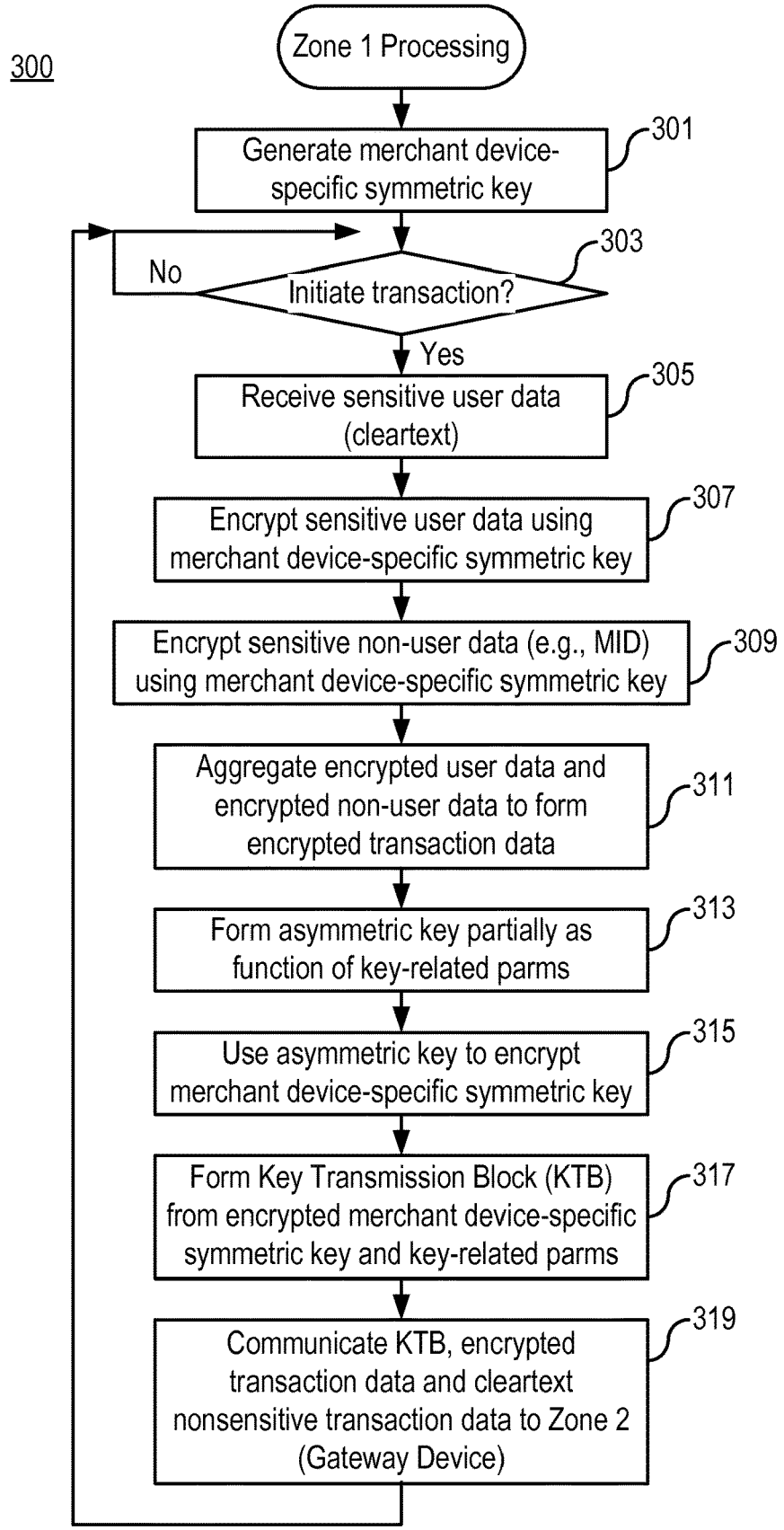
FIG. 3 is an exemplary flow diagram of steps/processes performed by the exemplary Zone 1 terminal.

A flow diagram of steps/processes performed by the Zone 1 terminal is depicted in FIG. 3. These steps can be carried out by, for example, the Zone 1 terminal 200 depicted in FIG. 2. In another aspect, FIG. 3 can alternatively be considered to schematically depict various means for performing the defined functions of a zone 1 processor in accordance with an exemplary embodiment consistent with the invention.

Processing can be considered to begin with the Zone 1 terminal 200 generating a merchant device-specific symmetric key (step 301) that will be used by encryption processes performed by the Zone 1 terminal. As used herein, the term "merchant device-specific" is used to indicate that the generated symmetric key is unique to this particular merchant device—other Zone 1 terminals generate keys that, in all likelihood, are different from one another, so that the key used by one Zone 1 terminal cannot be used to decrypt data that has been encrypted by a different Zone 1 terminal.

The generated merchant device-specific symmetric key can be used for many transactions carried out by the Zone 1 terminal 200. However, for added security, it is advantageous to change the merchant device-specific symmetric key from time to time (e.g., on a daily basis). In this manner, even if the merchant device-specific symmetric key falls into the hands of an unauthorized user, any unauthorized use of it is limited to only those transactions that made use of the merchant device-specific symmetric key before it was changed.

The Zone 1 terminal 200 may sit idle for a while ("NO" path out of decision block 303). However, at some point a transaction is initiated by any number of known mechanisms (e.g., by a customer swiping a credit card through a magnetic stripe reader 201) ("YES" path out of decision block 303). In response, sensitive user data is received (e.g., by means of the magnetic stripe reader 201) (step 305).

The sensitive user data is encrypted using the merchant device-specific symmetric key (step 307). (The Zone 1 terminal's symmetric key is illustrated as the "Terminal Specific Key 227" and the encryption algorithm is represented by the "Crypto SW 229", both in FIG. 2) Only after it is encrypted is made accessible to the Zone 1 terminal's application and/or operating system for further processing. (The Zone 1 terminal's application software is represented as "Payment App SW 231" in FIG. 2.) Performing this encryption prior to application processing protects the sensitive user data from exposure to a compromised version of the Zone 1 terminal's application software. To facilitate the Zone 1 terminal's application processing, a format preserving encryption process can be used. Format preserving encryption technology is known in the art and can provide encrypted data in a format that is acceptable to the Zone 1 application processing (e.g., the formatting of digits, such as the use of ASCII representation of digits, and self-referencing of data that are present in the cleartext version of the sensitive user data are preserved in the encrypted data). One example out of a number of possible sources of format preserving encryption technology is Voltage Security located in Palo Alto, Calif., USA.

Those fields of the transaction data generated by the Zone 1 application processing that are considered to be sensitive (and therefore needing of protection, such as the Merchant Identifier—"MID") are then encrypted using the merchant device-specific symmetric key (step 309) in order to further protect other sensitive data that may have been added as a result of the Zone 1 application processing (e.g., other data elements that are sensitive to the implementing entity's payment card processing operations but not necessarily payment card data, such as a Merchant Identifier). In some embodiments the fields that are encrypted include track data, PAN, and MID. In alternative embodiments, other fields, such as Card Verification Value 2 (CVV2), may also be encrypted.

Encrypted transaction data is then formed by aggregating the encrypted sensitive user data and the encrypted sensitive non-user data (step 311). In some embodiments there may additionally be non-sensitive transaction data that can remain in cleartext form.

It is intended to communicate the transaction data to a gateway device of the electronic payment system. Because the transaction data is encrypted by means of a merchant device-specific symmetric key, it is necessary to provide the gateway device with a copy of the merchant device-specific symmetric key to enable it to decrypt the transaction data and thereby make use of it in its own processing. This must be done in a secure way to avoid compromising the entire security of the system. Therefore, in accordance with another aspect of embodiments consistent with the invention, an asymmetric key is used to encrypt the merchant device-specific symmetric key. The Zone 1 terminal 200 can be provided with this asymmetric key in any of a number of ways. For example, the electronic payment system's gateway device can provide each Zone 1 terminal 200 with its public key of an asymmetric key pair (i.e., comprising a public key and a private key). Although simple in concept, this can involve quite a lot of processing and utilize a relatively large portion of system capacity if the gateway device has to communicate the public key to each one of many possible Zone 1 terminals. Since the gateway device's asymmetric key pair may be changed regularly (e.g., once daily) in order to add more security to the process, communicating the public key would constitute a large amount of overhead that would be incurred on a persistent basis.

To avoid this key management overhead, and in another aspect of some but not necessarily all embodiments consistent with the invention, each Zone 1 terminal obtains the asymmetric key by means of a process that includes Identity Based Encryption, which is well known in the art. In an Identity Based Encryption process, one entity/device uses an algorithm to derive the public key of another entity/device based on an identifier of the device (e.g., an email address or other unique identifier). Thus, by knowing a parameter indicative of an identity of the electronic payment system's gateway device, each Zone 1 terminal 200 is able to derive an asymmetric key associated with the gateway device.

In the exemplary embodiment, the derived asymmetric key associated with the gateway device is the same across all terminals within Zone 1, although this is not an essential aspect of the invention; embodiments can be envisioned in which the asymmetric key is different between two or more terminals within Zone 1. In yet another aspect of some but not necessarily all embodiments consistent with the invention, additional security is added by dynamically (i.e., over time) varying the asymmetric key within each given Zone 1 terminal 200. This is achieved by using the Identity Based Encryption process to derive what is really only an initial asymmetric key. The Zone 1 terminal 200 then alters the initial asymmetric key as a function of one or more key-related parameters. The one or more key-related parameters can be, for example, time and/or date information (referred to herein generically as "time parameters"). Another example of a key-related parameter in some embodiments is a host identity string Thus, in the exemplary embodiment, the Zone 1 terminal 200 forms the asymmetric key at least partially as a function of key-related parameters (step 313). The asymmetric key may also be formed at least in part, as a function of an identifier of the electronic payment system gateway device, as described above.

The Zone 1 terminal 200 then uses the asymmetric key to encrypt the merchant device-specific symmetric key (step 315). Because the asymmetric key was generated by the Zone 1 terminal 200 (e.g., by generating an initial asymmetric key (public) using an identity based encryption mechanism and then modifying the initial asymmetric key as a function of one or more other parameters), the electronic payment system's gateway device will not have the matching private asymmetric key needed to decrypt the merchant device-specific symmetric key. To address this issue, and in accordance with yet another aspect of some but not necessarily all embodiments consistent with the invention, the Zone 1 terminal 200 generates a Key Transmission Block (KTB) that comprises the encrypted merchant device-specific symmetric key and the one or more key-related parameters that were used in the process of altering the initial asymmetric key (step 317). By having this information, the electronic payment system's gateway device will be able to use the same key-related parameters to modify its own private asymmetric key (used as an initial private asymmetric key) to produce a private asymmetric key capable of decrypting the encrypted merchant device-specific symmetric key.

Accordingly, the Zone 1 terminal 200 communicates the Key Transmission Block as well as the encrypted transaction data and the cleartext nonsensitive transaction data (if any) to a Zone 2 gateway device of the electronic payment system (step 319). The communication may also include other information, such as an indication of the type of service or services (e.g., authentication, authorization of payment) being requested by the Zone 1 terminal 200.

The illustrated embodiment of FIG. 3 is structured facilitate a clear understanding of various aspects of embodiments consistent with the invention. Those of ordinary skill in the art will recognize that alternative embodiments can readily be derived that, for example, perform in a more efficient manner. For example, the steps that form the asymmetric key and then form the key transmission block (i.e., steps 313, 315, and 317) are depicted as occurring once for every initiated transaction. However, in practical embodiments the key transmission block will remain unchanged for many transactions, since it only needs to change whenever the merchant device-specific symmetric key changes or when the key-related parameters change (since changing the latter will result in the asymmetric key changing as well). Accordingly, it may be more efficient to generate a key transmission block only when such a change occurs, and to store the resultant key transmission block. In such embodiments, steps 313, 315, and 317 can be replaced by a step that, for example, simply retrieves the present key transmission block from its stored location.

3. Payment Zone 2: Processor Authorization Network Gateways and Earliest Point Encryption The implementing entity must pass encrypted transactions processed from the first Payment Zone to Payment Zone 2 because the first Zone will have data encrypted under different protocols and parameters. Zone 2 allows the implementing entity to re-encrypt data under a consistent scheme.

To protect the data while the transition from Zone 1 to Zone 2 encryption occurs, Hardware Security Modules should be used. The Hardware Security Modules (HSM) are specialized computer platforms that employ physical and logical protections to support secret cryptographic operations in the most secure manner available. The implementing entity's applications will pass Zone 1 enciphered data to the HSM and receive Zone 2 enciphered data as output (i.e., the enciphered data from Zone 1 is decrypted and re-encrypted into a Zone 2 format, as will be discussed further below).

The End to End Encryption Security model requires that applications never receive sensitive data in plain text during the transition between Payment zones that are under the complete control of the implementing entity. In the exemplary embodiment, this means that the MID is transmitted in encrypted form from Zone 1 to Zone 2. In Zone 2, the MID is decrypted and not carried forward to other zones. PAN data is transmitted in encrypted form from Zone 1 to Zone 2. The PAN is then recrypted in Zone 2 and passed to Zone 3, where it is decrypted. It is passed in plain text form (along with track data) to Zone 5 (since Zone 5 does not handle encrypted data in this exemplary embodiment). However, the PAN is first recrypted before sending it from Zone 3 to Zone 4. The PAN is decrypted in Zone 4 and transmitted in plain text (along with track data) from Zone 4 to Zone 5. As to track data, it is encrypted for communication from Zone 1 to Zone 2, and is then decrypted to plain text form in Zone 2 (except for the part of the track data that is the PAN).

For transactions originating from non-encrypting points, for example devices that do not support encryption or Payment application middleware, the implementing entity will apply encryption to the sensitive data of the transaction at the earliest point possible. This data will be encrypted as an operation under Payment Zone 2.

Figure 4:
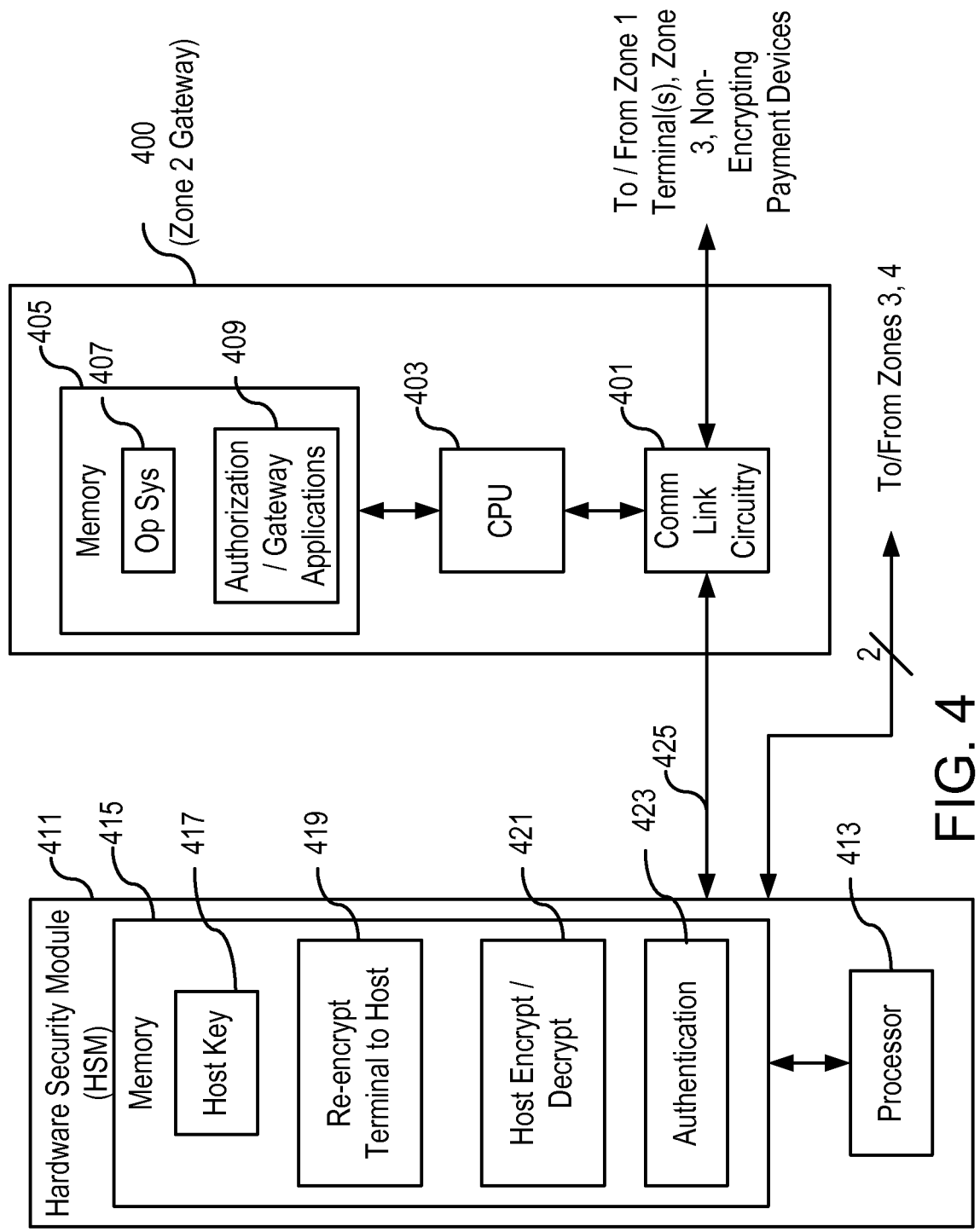
FIG. 4 is a block diagram illustrating an exemplary Zone 2 gateway device in accordance with aspects of the invention.

Thus, in accordance with aspects of embodiments consistent with the invention, an exemplary Zone 2 gateway device 400 suitable for use in embodiments of the End to End model includes the following elemental classes of components as illustrated in the block diagram FIG. 4:

1. Communication link circuitry 401 (e.g., dial-up and IP modules), coupled to a zone 2 gateway device processor 403 (see below) for providing one or more communications links to the outside world (e.g., to a plurality of Zone 1 merchant terminal devices, to a Zone 3 server, and (optionally) to non-encrypting payment devices).

2. The zone 2 gateway device processor 403 (e.g., central processing unit—"CPU"), memory 405 (coupled to the processor 403 to enable the processor 403 to store data into, and retrieve data from, the memory 405), an operating system 407 (in this embodiment stored in the memory 405, although in other embodiments a separate memory could be provided for this storage) and authorization/gateway application software 409.

3. Access to a Hardware Security Module 411. The Hardware Security Module 411 comprises a processor 413 coupled to a memory 415. In this exemplary embodiment, the memory 415 stores a host encryption key ("host key") 417 that is used in Zones 2, 3, and 4; software 419 for decrypting encrypted transaction data and re-encrypting the transaction data using the host key; and software 421 for generally encrypting and decrypting information using the host key 417. The Hardware Security Module 411 further includes authentication software 423 for providing authentication functionality. The Hardware Security Module also includes active tamper detection circuitry (not shown) for monitoring all of the Hardware Security Module's elements, including the integrity of its entire package. The active tamper detection circuitry responds in an appropriate way to protect sensitive information in response to any detection of physical and/or electronic tampering.

4. In this exemplary embodiment, the access to the Hardware Security Module 411 is provided by a communications link 425 connected at one end to the processor 403 and at another end to the HSM 411. In the exemplary embodiment, the Hardware Security Module 411 is not made an integral part of the Zone 2 Gateway 400, but is instead shared by each of Zones 2, 3, and 4. Hence the communications link 425 can be embodied using any of a number of known techniques for providing reliable, secure communication. In alternative embodiments, each of Zones 2, 3, and 4 could have its own dedicated Hardware Security Module.

The gateway device 400 includes other circuitry as well (e.g., power supply, battery backup, but these have been omitted from the figure in order to avoid cluttering it with unnecessary detail.

Figure 5A:
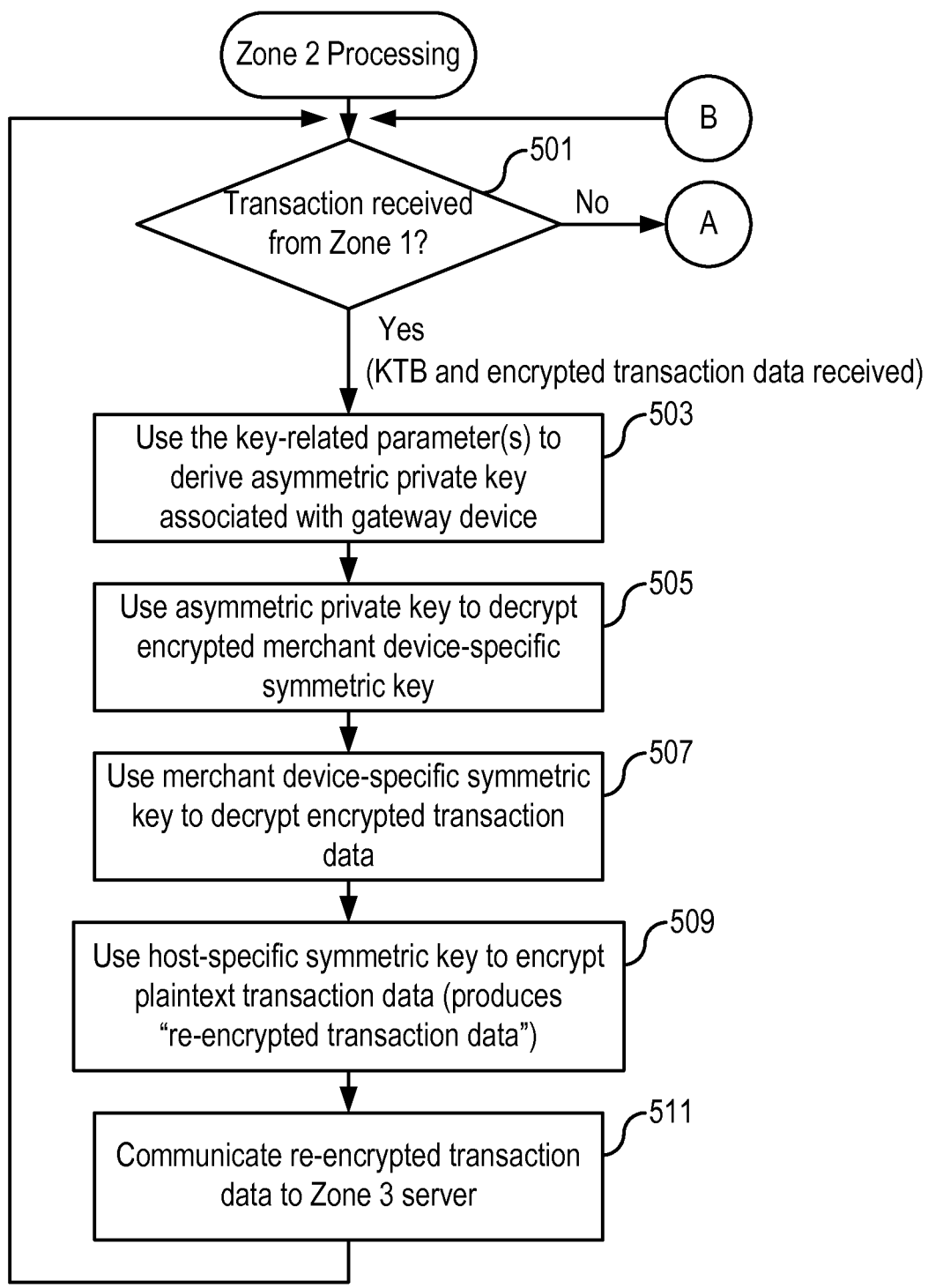
FIGS. 5a-5b together constitute an exemplary flow diagram of steps/processes performed by a Zone 2 gateway device in accordance with aspects of the invention.
Figure 5B:
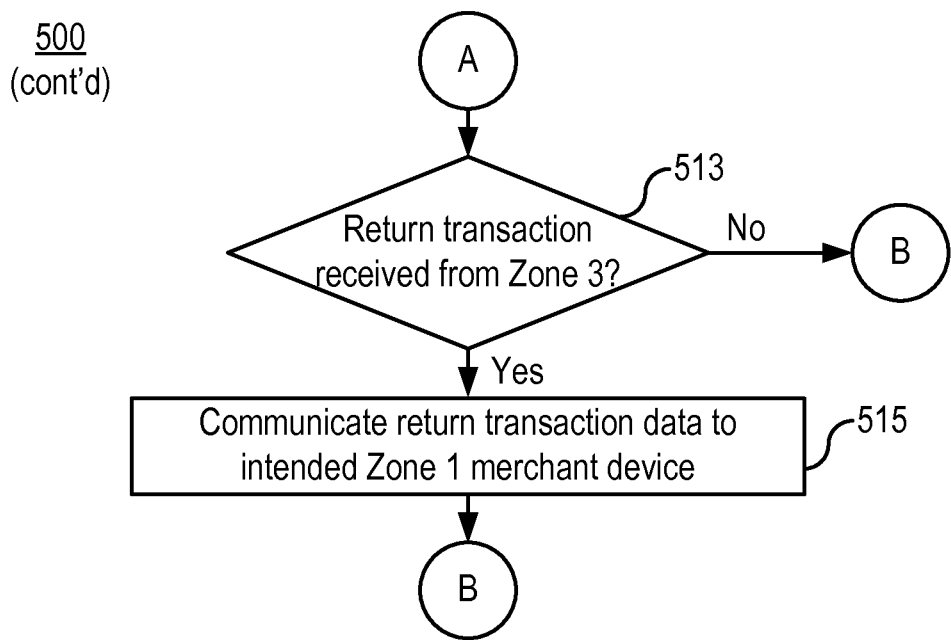

A flow diagram of steps/processes performed by the Zone 2 gateway device 400 is depicted in FIGS. 5a-5b. These steps can be carried out by, for example, the various circuit elements associated with the Zone 2 gateway device 400 depicted in FIG. 4. In another aspect, FIGS. 5a-5b can alternatively be considered to schematically depict various means for performing the defined functions of a Zone 2 gateway device in accordance with an exemplary embodiment consistent with the invention.

In the following, all encryption and decryption actions are carried out by the hardware security module 411 at the request of the Zone 2 gateway 400. As mentioned before, in some embodiments (including this exemplary embodiment), the hardware security module 411 is not integrally associated with the Zone 2 gateway 400. Accordingly, here as well as in the claims, any description of the Zone 2 Gateway "encrypting" or "decrypting" data should be construed to include the Zone 2 Gateway 400 making suitable requests of the Hardware Security Module 411 to have the desired action carried out on its behalf, with the results being returned. In this sense, the Hardware Security Module is made a virtual part of the Zone 2 Gateway, even though it may be a physically distinct element within the entire electronic payment system. Processing can be considered to begin with the Zone 2 gateway device 400 ascertaining whether a transaction has been received from a Zone 1 terminal 200 (decision block 501). If so ("YES" path out of decision block 501), it means that sensitive information, encrypted by means of a merchant-device specific symmetric key, has been received. Since the merchant-device specific symmetric key for this transaction is not pre-stored in the gateway device 400 (nor in any other server of the electronic payment system), the gateway device must decrypt the encrypted version that has been received as part of the key transmission block (see, e.g., FIG. 3), the goal being to re-encrypt the transaction data using a host-specific encryption key (e.g., symmetric key, asymmetric key, and the like) so that the re-encrypted data can be passed along to a Zone 3 device (and possibly beyond).

Accordingly, the gateway device 400 uses the one or more key-related parameters to modify an initial form of its private asymmetric key to form an asymmetric private key capable of being used to decrypt the encrypted merchant device-specific symmetric key (step 503). The asymmetric private key is then used to decrypt the encrypted merchant device-specific symmetric key (step 505).

The merchant device-specific symmetric key is then used to decrypt the received encrypted transaction data (step 507). In the exemplary embodiment, the host-specific encryption key is a symmetric key that is then used to encrypt the decrypted transaction data, thereby forming re-encrypted transaction data (step 509). The re-encrypted transaction data is then communicated to a Zone 3 server (step 511). Because of the re-encryption, this communication is performed in a secure manner.

Returning to a consideration of decision block 501, if there has not been received a transaction from Zone 1, it is then ascertained whether a return transaction from the other direction, namely from Zone 3, has been received (decision block 513—see FIG. 5*b*). If not ("NO" path out of decision block 513), there is nothing to do but to return to decision block 501 and begin Zone 2 processing again.

However, if a return transaction has been received from Zone 3 ("YES" path out of decision block 513), the return transaction data is communicated to the originating Zone 1 device 200 (step 515). Processing reverts back to step 501 to begin again.

4. Payment Zone 3: Authorization Processing

This zone represents the systems and subsystems that comprise core authorization processing. This can be on a server CPU or on a dedicated processor of an HSM. A significant operation in Zone 3 is the exchange of data with payment account Issuers and gateways (see Zone 5 discussion below) for authorization processing. The End to End Security model can collaborate with conventional authorization endpoints (i.e., those that may not employ data level encryption for communications to/from Zone 5). However the greatest security is achieved when these endpoints cooperate with the implementing entity by accepting and producing encrypted data. In embodiments where data is not encrypted for communications to and from Zone 5, the implementing entity decrypts data within Zone 3 to prepare data files that are exchanged with the authorization endpoints. The current invention contemplates a system-wide model utilizing encrypted data when communicating with Zone 5 for authorization processing. Further, payment Zone 5 may establish a separate zone for allowing the transmission of encrypted data as a preferred means of exchange. Regardless of whether encrypted data or plain text is communicated to/from Zone 5, Zone 3 processing itself operates on encrypted data.

Figure 6:
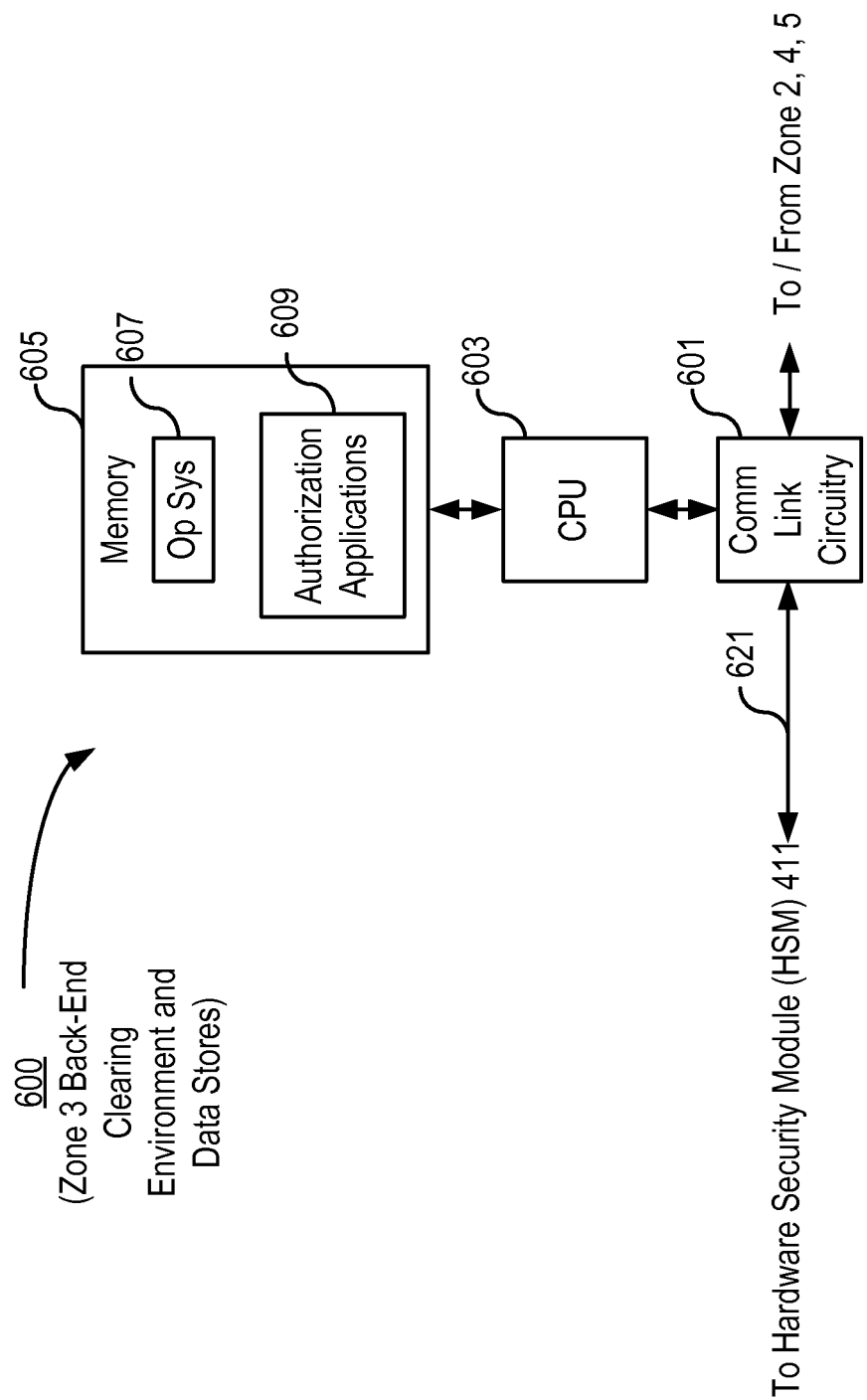
FIG. 6 is a block diagram illustrating an exemplary Zone 3 server in accordance with aspects of the invention.

Thus, in accordance with aspects of embodiments consistent with the invention, an exemplary Zone 3 server 600 suitable for use in embodiments of the End to End model includes the following elemental classes of components as illustrated in the block diagram FIG. 6:
1. Communication link circuitry 601 (e.g., dial-up and IP modules), coupled to a zone 3 device processor 603 (see below) for providing one or more communications links to the outside world (e.g., to a Zone 2 gateway, and to Zone 4 and 5 servers.
2. The zone 3 device processor 603 (e.g., central processing unit—"CPU"), memory 605 (coupled to the processor 603 to enable the processor 603 to store data into, and retrieve data from, the memory 605), an operating system 607 (in this embodiment stored in the memory 605, although in other embodiments a separate memory could be provided for this storage) and authorization application software 609.
3. Access to the Hardware Security Module 411 (or alternatively, an additional Hardware Security Module (not shown) dedicated for use with Zone 3 server 600.
4. In this exemplary embodiment, the access to the Hardware Security Module 411 is provided by a communications link 621 connected at one end to the processor 603 and at another end to the HSM 411.

The Zone 3 server 600 includes other circuitry as well (e.g., power supply, battery backup), but these have been omitted from the figure in order to avoid cluttering it with unnecessary detail.

5. Payment Zone 4: Back-end Processor Clearing Environment and Data Stores

Data that has passed through Zone 3 and completed the authorization processing moves to Zone 4. Here the data is at rest in longer term storage, whether in a database or a file on a hard drive or other media. The special characteristics of the data in this Zone derive from the business operations that rely on sensitive payment account data being available for the clearing process and authorized users. However, the legitimate access of sensitive data in Payment Zone 4 must not increase the surface area of attack against the other zones.

Like the exchange of sensitive payment account data for authorization processing described between Zones 3 and 5, clearing processing operations in Zone 4 interface with clearing endpoints that are not in the control of the implementing entity. It is preferred to encrypt the data exchanged with clearing endpoints. In alternative embodiments (e.g., those using the clearing endpoints of other entities), however, there may be an encryption gap between Zone 4 and 5 when the implementing entity decrypts sensitive payment account data to create the Clearing and Settlement files that are exchanged with the clearing endpoints. As in Zone 3, this is an industry vulnerability and the End to End Security Model prefers the exchange and use of encrypted data for performance of clearing processing.

For business operations that require sensitive data for legitimate business processes, the End to End Encryption Security model calls for users accessing sensitive payment account data and decrypting encrypted data for legitimate purposes to be authenticated prior to accessing decrypted sensitive payment account data and system access controls enforced by the data owners.

Figure 7:
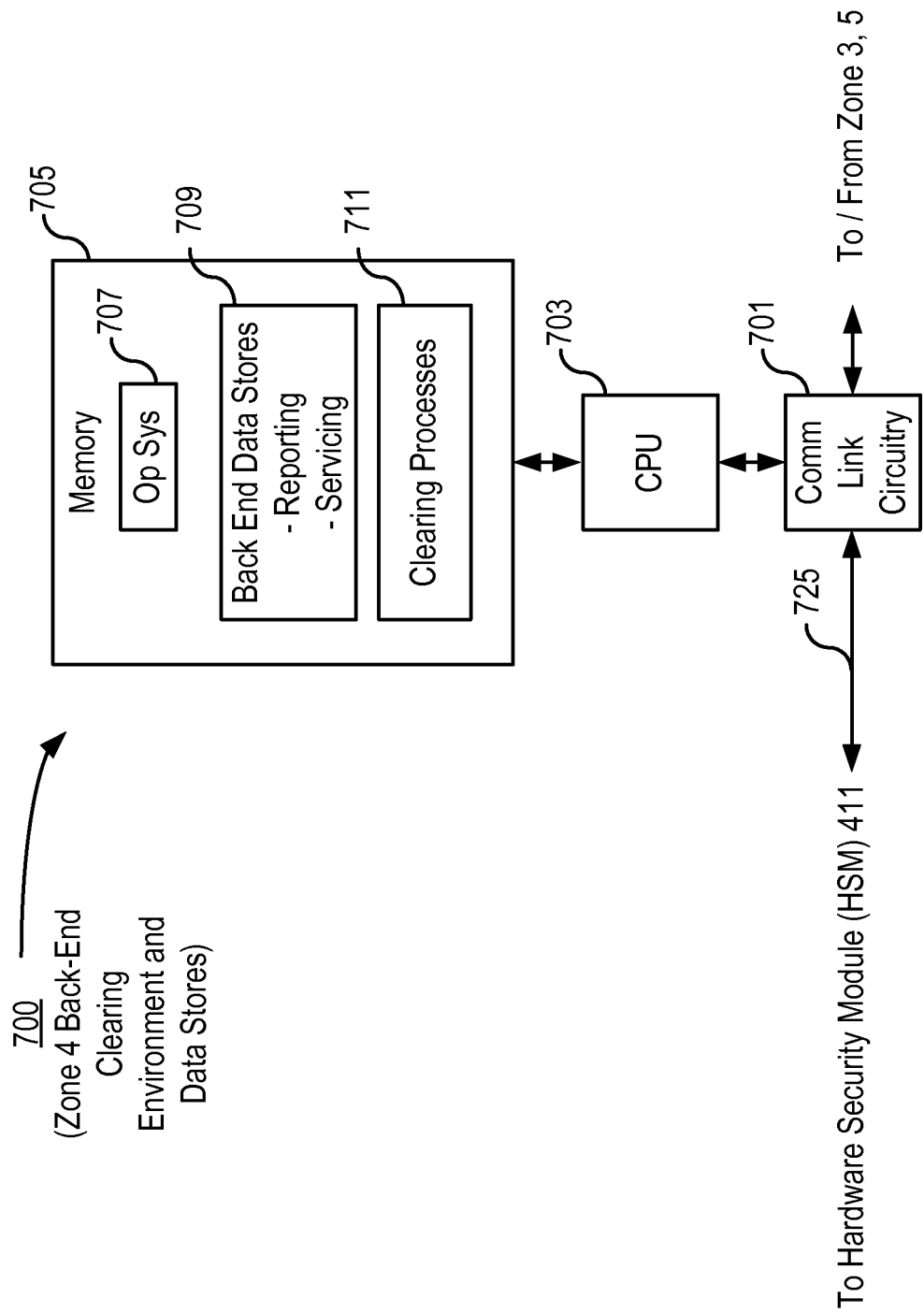
FIG. 7 is a block diagram illustrating an exemplary Zone 4 server in accordance with aspects of the invention.

Thus, in accordance with aspects of embodiments consistent with the invention, an exemplary Zone 4 server 700 suitable for use in embodiments of the End to End model includes the following elemental classes of components as illustrated in the block diagram FIG. 7:
1. Communication link circuitry 701 (e.g., dial-up and IP modules), coupled to a zone 4 device processor 703 (see below) for providing one or more communications links to the outside world (e.g., to a Zone 3 and Zone 5 servers.
2. The zone 4 device processor 703 (e.g., central processing unit—"CPU"), memory 705 (coupled to the processor 703 to enable the processor 703 to store data into, and retrieve data from, the memory 705), an operating system 707 (in this embodiment stored in the memory 705, although in other embodiments a separate memory could be provided for this storage), Back End Data Stores (e.g., for reporting and servicing) 709 and clearing process software 711.
3. Access to the Hardware Security Module 411 (or alternatively, an additional Hardware Security Module (not shown) dedicated for use with Zone 4 server 700.
4. In this exemplary embodiment, the access to the Hardware Security Module 411 is provided by a communications link 725 connected at one end to the processor 703 and at another end to the HSM 411.

The Zone 4 server 700 includes other circuitry as well (e.g., power supply, battery backup), but these have been omitted from the figure in order to avoid cluttering it with unnecessary detail.

6. Payment Zone 5: Authorization and Clearing Processes to 3$^{rd}$ Party End-Points As described in Payment Zone 3 and 4, gaps in the End to End protection of data presently exist in the industry and therefore in some but not all embodiments consistent with the invention. Payment Zone 5 recognizes the need for a Payment Zone that includes the processor and the authorization and clearing endpoint. That is, Zone 5 represents a processing realm that is no longer within that of the implementing entity's processing network but is instead under the control of the authorization networks of outside entities (e.g., the debit/credit card brands' own networks).

The application of data encryption to sensitive data within files provides benefits to exemplary embodiments, as does securing the communications channel. Where data level encryption may not be available and even when it is, the current invention contemplates the use of encrypted communication channels, such as Secure Sockets Layer (SSL), to assist in protecting data from intercept, access, and compromise by unauthorized actors. In this manner sensitive data, such as user account information and other types of transaction data, may avoid being communicated in the clear with no protection or benefit from both data and communication channel encryption.

7. Authenticating the Device Application

Devices that process payment transactions interface with payment applications that prepare the transaction messages and interface with the processor's host. Applications that run on a payment device (e.g., a Zone 1 device 200) that supports encryption might be leveraged by unauthorized individuals or entities to expose the cryptographic secrets of the device. The End to End Security Model therefore preferably includes authentication of applications by the device Operating System (e.g., the operating system 219) before the application is allowed to run on the device. For this reason, it may be advantageous to store the operating system in a secure memory that is separate and apart from the memory in which the application is stored (i.e., to thwart an attempt to compromise the operating system itself). Techniques for authorizing an application loaded onto a device are known in the art and therefore need not be described herein further. It is preferred, but not essential, that any code signing authentication process accepted by the POS industry be used.

8. The Encryption Strategy

It is herein recognized that that multiple solutions will be available for merchants and processors to realize the goals of end to end encryption. The strategy described herein embraces and encourages innovation in the industry and will support both proprietary as well as non-proprietary encryption implementations from one or multiple vendors.

The sections below discuss how the End to End Security model is addressed in an exemplary embodiment consistent with aspects of the invention.

8.1. An Exemplary Embodiment

Based on the evaluation of available technologies and providers, an exemplary end to end encryption solution includes introducing a device level encryption scheme (Payment Zone 1) that integrates with the implementing entity's processing network encryption (Payment Zone 2).

An aspect of the exemplary embodiment is an innovative Key Management mechanism and utilization of the most advanced encryption technologies available. The highest degree of encryption deployment is preferred.

8.1.1. Innovative Key Management

The exemplary embodiment enables each Zone 1 device to generate data encryption keys and public keys dynamically. The implementing entity does not have to inject keys to the terminal (i.e., Zone 1 device) at or after the initial manufacturing. The public keys are loaded into the terminal whenever software is loaded. As explained earlier, the implementing entity's host receives the merchant device-specific key data, wrapped in an asymmetric key, to decrypt the transaction, wherein the "transaction" can be an individual transaction or a batch of transactions. That is, the Zone 1 device encrypts transaction information by means of a symmetric key that is generated by the Zone 1 device. The Zone 1 device also encrypts the merchant device-specific key using one of a pair of asymmetric keys associated with the Zone 2 gateway device. Information encrypted by means of this asymmetric key can only be decrypted by means of the other one of the pair of asymmetric keys. Although not an essential aspect of the invention, the encrypting one of the asymmetric keys is preferably formed by the Zone 1 device based on an initial asymmetric key derived by means if identity based encryption that is modified by one or more parameters, and only the gateway device has access to the other initial asymmetric key from which the decrypting one of the asymmetric keys can be formed by modifying the other initial asymmetric key based on the one or more parameters used by the Zone 1 device. In this way, the implementing entity can be assured that unauthorized access of the cryptographic secrets of a single device will not expose more than a single batch worth of data Likewise, the implementing entity can be assured that unauthorized access to the data in flight between the device and the host cannot be read. This method also ensures that no database of keys resides on the processing network, further limiting the potential exposure for discovering the cryptographic secrets employed in the encryption.

8.1.2. Highest Protections

While the End to End model accepts and supports multiple encryption schemes, the exemplary embodiment is designed to surpass existing accepted means of encryption methods and key management.

The exemplary embodiment incorporates symmetric and asymmetric cryptography and employs modes of the Advanced Encryption Standard (AES) algorithm.

Keys that encrypt sensitive payment account and processing data (referred to as Data Encryption Keys) are never in the clear. These keys are always wrapped in another layer of protection called the Asymmetric Key, or Public Key. The "unwrapping" of the Data Encryption Keys and decryption of sensitive payment account and processing data is required to be performed within the Hardware Security Modules, never in software in the memory used by the application servers.

The exemplary embodiment avoids high overhead key management methods. The End to End model does not require the device and the host to pre-share keys because the device generates it own keys and transmits the key wrapping information to the host using an asymmetric Public key. This allows a pre-scheduled roll of the public parameters and allows the host to prompt every device to generate new public parameters as a response to a possible compromise. An advantage is that, because there is no secret key being injected into the Zone 1 device, the Zone 2 public key can be updated without a secure injection process being required from a controlled location or a special Remote Injection process protocol.

9. Further Notes on Encryption

Two approaches to encryption deployment are particularly suitable to the task of encrypting merchant data in various embodiments consistent with the invention. These are described in the following sections.

9.1. Format-Preserving Encryption

The first approach is format-preserving encryption (FPE). FPE generates an encrypted number that fits the industry-standard 16 digit format of PANs. This has the benefit of enabling standard Application software to process encrypted data without encountering formatting errors (e.g., incorrect encoding of digits, missing self-references within the digits, etc.) Techniques for performing FPE are known in the art. As indicated earlier, one example out of a number of possible sources of FPE technology is Voltage Security located in Palo Alto, Calif., USA. The algorithm is a combination of the AES encryption algorithm and a transformation series. This allows for encryption of just part of the PAN digit set (in the range from 13-19 digits). For example, the first 6 and last 4 digits of the PAN can be left as cleartext, with just the middle digits that it passes to the application being encrypted. The cleartext digits can be used to randomize the encryption of the central digits. Track 1 and track 2 data are fully encrypted between the POS system and the host.

One advantage of FPE is that the resulting data is compliant with pre-existing software that operates at the POS and within the merchant's back office. An advantage found in many tokenization schemes, this allows introduction of encryption with minimal disruption to the merchant's other systems. This offers the prospect of smooth integration into the merchant community.

AES is the benchmark encryption algorithm today because it is more secure than earlier algorithms—it utilizes 128-bit keys that cannot be expected to be broken with conventional computers. But AES is an algorithm designed to turn large blocks of data into gibberish. Card numbers, track 1 and 2 data as well as social security and license numbers, on the other hand, are comparatively small bits of digital data. With the FPE scheme, the benefits of encryption are inserted into existing systems with little programming change required.

9.2. Identity-Based Encryption

The goal of Identity-Based Encryption (IBE) is to reduce the burden of public key management that has inhibited the broad deployment of Public Key Infrastructure (PKI). With IBE, a role or identity is used as a public key as a means to replace the need for certificates, all made possible by recently developed algorithms. IBE techniques are well-known in the art and therefore need not be described herein in further detail.

In the End to End model, IBE is used to solve the problem of key injection by eliminating what has always been an expensive and time consuming step. Once a day or as often or whenever the implementing entity or the merchant's information security team determine, the Zone 1 terminal generates a new symmetric key (i.e., the merchant-device specific symmetric key) which is transmitted to the implementing entity's key server when a transaction occurs. This might happen after the day's batch has been uploaded for example. Given that frequency, no physical handling of the POS terminal for key injection is required. The IBE method is an example of public key cryptography and offers an elegant approach to key management within a POS estate. If somehow the symmetric key is compromised, the exposure is limited to the single batch from that specific terminal.

10. Further Notes About Zone 4

As stated, the current invention contemplates that encrypted data be exchanged with Zone 5 and the issuing domain. If implemented utilizing non-encrypting standards, once the transaction leaves Zone 4, the card data has to be decrypted and sent in the form of cleartext into card brands authorization and settlement systems using today's secure direct connections.

11. Benefits

Embodiments, such as apparatus, system and software, consistent with the invention may provide significant benefits including a significant reduction in the scope and cost of Payment Card Industry (PCI) compliance for the merchant and the assurance by the implementing entity that a merchant may have significantly reduced exposure to responsibility for any data breach liability caused by hacking or interception of data once it is entered into an End to End model-based apparatus, system or software. When a shift happens like this, merchants benefit.

Additional embodiments consistent with the invention, such as terminal apparatus built in accordance with the various inventive aspects, may provide benefits in that they can be made in both countertop and multi-lane versions. POS terminals are a vehicle for delivering value-added services around the transaction. As this transactional metadata—the data about and around the transaction data itself—becomes more valuable, end-to-end control offers a secure channel and a dedicated path for couponing, rewards and other applications that benefit the merchant and, as value added services, can drive incremental revenue for both the implementing entity and its customers.

To further facilitate an understanding of the various aspects of embodiments consistent with the invention, FIG. 2 is provided, which is a diagram illustrating the flow of encrypted data through the End to End Model.

It will be appreciated from the above description that the End to End model uses a vertically integrated approach. This enables an implementing entity to control the span of processing technology that is within its domain of control in order to provide a secure path for card data across the elements it controls.

Figure 8A:
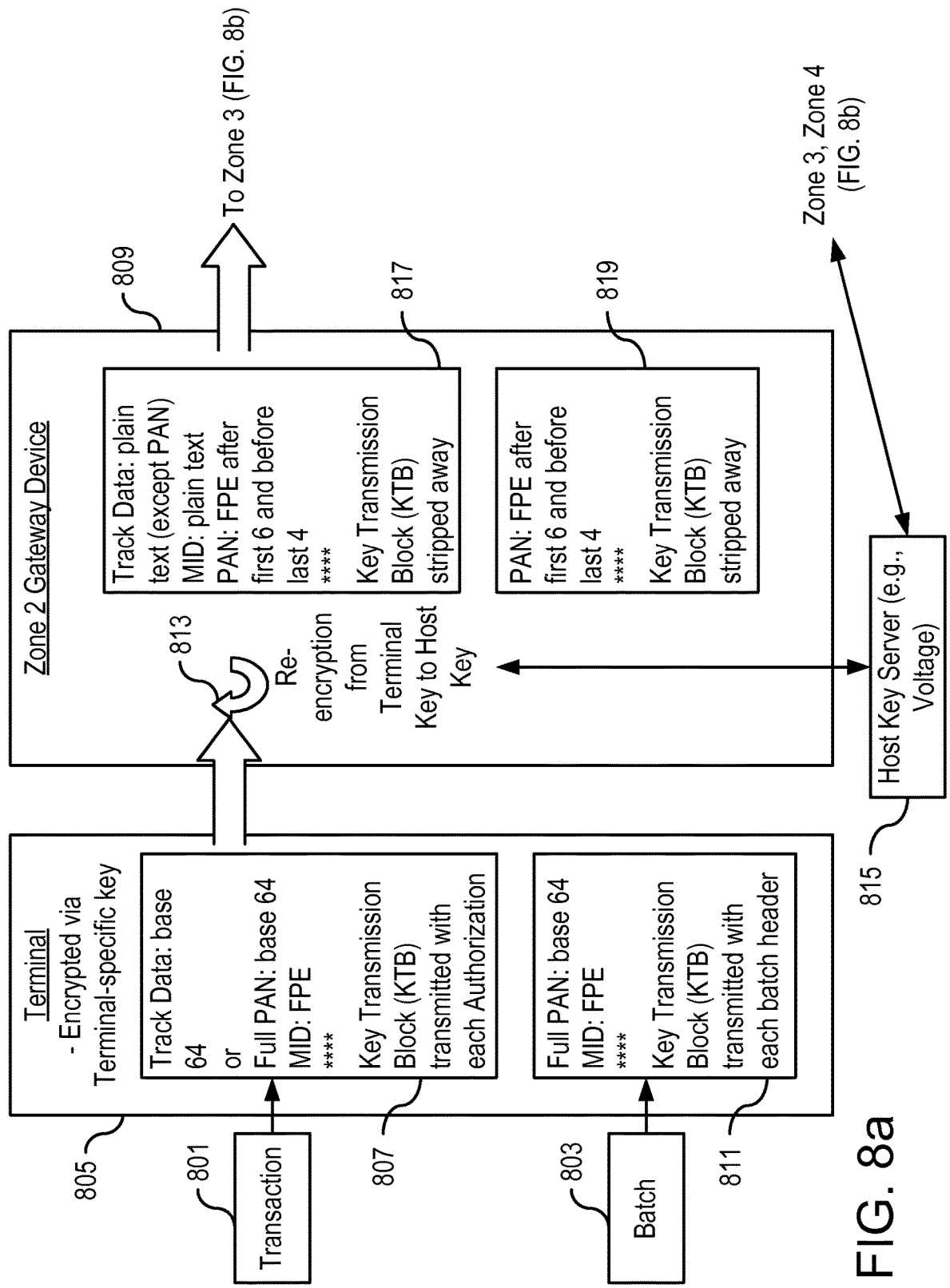
FIGS. 8a-8b together constitute a diagram illustrating the flow of encrypted data through an exemplary electronic credit and debit transaction system in accordance with aspects of the invention.
Figure 8B:
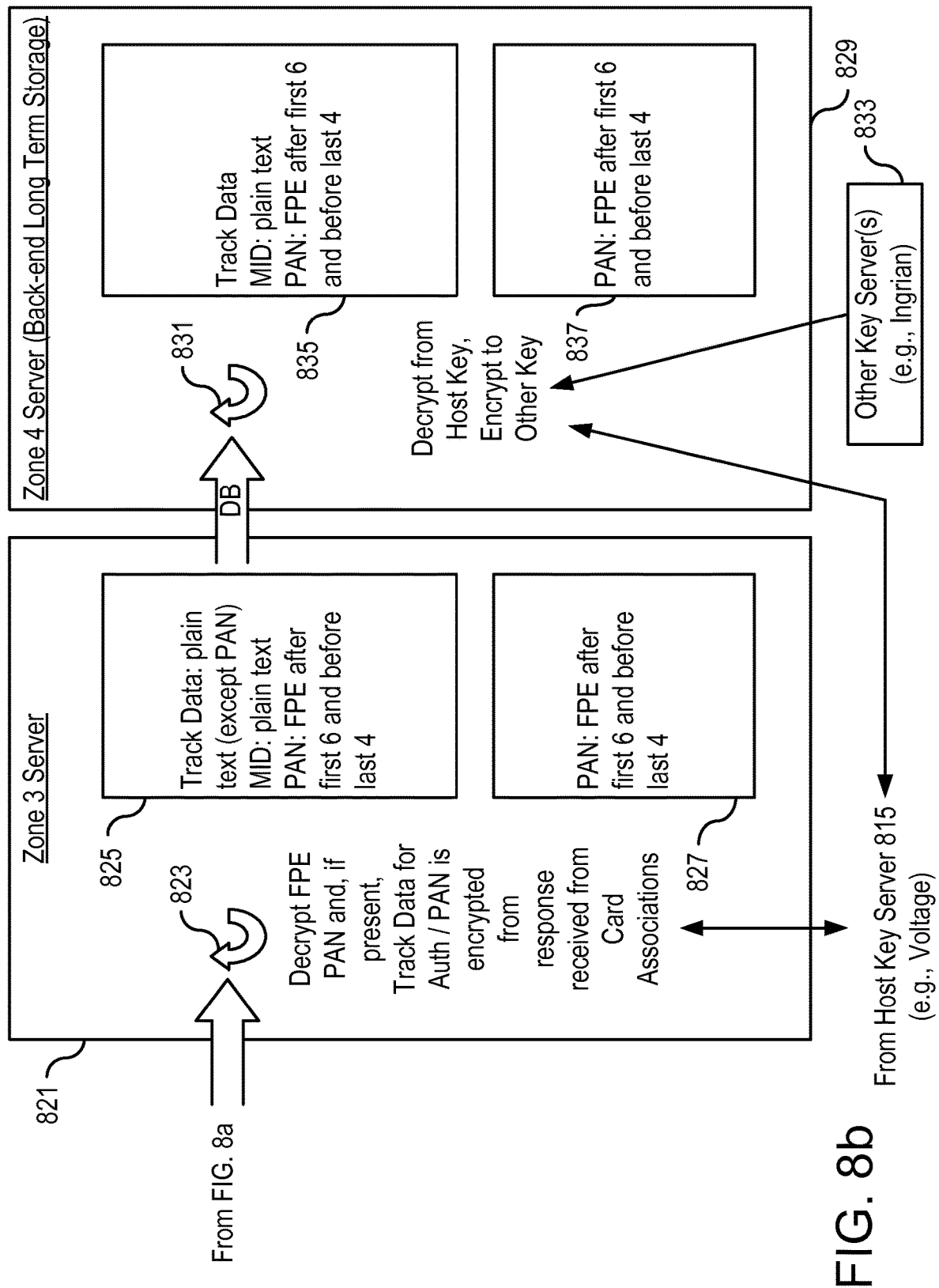

In order to further illustrate various aspects of embodiments consistent with the invention, FIGS. 8a-8b will now be described. These figures together constitute a data flow diagram illustrating how various data items are moved from one zone to another in a secure manner in accordance with an exemplary embodiment of the invention. The illustrated data need not be the same in all embodiments; in alternative embodiments, different data items can be involved, and different encryption can be used. The purpose of this embodiment is to serve as an example from which various inventive principles can be illustrated and further described.

The flow of single transaction items 801 is depicted horizontally in an upper portion of the figures, whereas the flow of a batch 803 of data items is depicted horizontally in a lower portion of the figures.

Transactions originate in a Zone 1 terminal, as discussed above. As soon as possible upon being entered into the Zone 1 terminal 805 (e.g., as soon as possible after swiping a card through a magnetic card stripe reader or manually entering data), the data is encrypted using the merchant device-specific symmetric key. The Zone 1 terminal 805 operates in accordance with principles described above, and for a single transaction generates encrypted data 807 comprising Track Data (base 64 format) or a Full Personal Account Number (PAN) (base 64 format), and a Merchant Identifier (MID) (encrypted via format preserving encryption—"FPE"). The encrypted data 807 further includes a key transmission block as described earlier. (It will be understood from the complete description presented earlier that the key transmission block is not encrypted using the merchant device-specific symmetric key, since the purpose of the key transmission block is to enable the Zone 2 gateway to derive the merchant device-specific symmetric key so that the remainder of the data can be decrypted.) The encrypted data (including the key transmission block) is then communicated to the Zone 2 gateway device 809.

In batch mode 803, the encrypted data 811 includes, for each transaction in the batch, the full PAN (base 64 format) and the MID (encrypted via FPE). The batch data along with a key transmission block is communicated to the Zone 2 gateway device 809. In various alternative embodiments, the Zone 2 gateway device 809 is capable of communicating with the Zone 1 Terminal by means of dial-up communication, by means of Internet Protocol, or both. Each of these capabilities is known in the art and need not be described here in further detail.

Upon receipt in the Zone 2 gateway device 809 the received data (individual transaction or batch) is re-encrypted 813 as described earlier, from an encrypted form based on the merchant device-specific symmetric key to an encrypted form based on the host key. In this example, the re-encryption is depicted being performed by a host key server 815. After re-encryption, the individual data 817 comprises track data that, except for the PAN, is in plain text; and the PAN whose digits following the first 6 and prior to the last 4 have been encrypted by means of a format preserving encryption algorithm (the initial 6 and final 4 digits of the PAN are in plain text).

After re-encryption, the batch data 819 comprises, for each transaction included in the batch, the PAN whose digits following the first 6 and prior to the last 4 have been encrypted by means of a format preserving encryption algorithm (the initial 6 and final 4 digits of the PAN are in plain text). Neither the individual data 817 nor the batch data 819 includes the key transmission block since this information is used by only the Zone 2 gateway device 809; the host key is already known to the Zone 3 and Zone 4 servers, so there is no need to communicate it from Zone 2.

The individual data 817 or batch data 819 (depending on mode) is then communicated to the Zone 3 server 821.

The Zone 3 server 821 functions 823 include decryption of the format preserving encrypted PAN (received from Zone 2), and if it is present, the Track Data for Authorization. The PAN (received from Zone 5) is encrypted from the response received from Card Associations (Zone 5). In this exemplary embodiment, these processes are performed by the host key server 815. Thus, with respect to single transactions, the data 825 includes the track data in plain text except for the PAN. The MID is also in plain text. The PAN digits in-between the first 6 and the last 4 are encrypted by means of an FPE algorithm; the remaining digits of the PAN (i.e., the first 6 and the last 4) are in plain text.

With respect to batch transactions, the data 827 includes the PAN, with the digits in-between the first 6 and the last 4 being encrypted by means of an FPE algorithm; the remaining digits of the PAN (i.e., the first 6 and the last 4) are in plain text.

The Zone 3 server passes off its transaction or batch data (depending on mode) to a Zone 4 server 829 which provides database functionality for the electronic payment system. Encryption and Decryption operations 831 are also performed in Zone 4 829. For example, data received from Zone 3 is decrypted from its host key encrypted format as part of the process of providing the information to Zone 5 servers. Information received in return from the Zone 5 servers may be encrypted using the host key so that it can be securely stored in the database. The exemplary host key server 815 is depicted as performing these tasks. If the Zone 5 servers incorporate encryption, then prior to communicating information to Zone 5 the decrypted data will, in some embodiments, be re-encrypted using a key associated with the corresponding outside server. In this exemplary embodiment, the Zone 4 server is shown relying on one or more "other key server(s)" 833 for this functionality.

The single transaction data 835 stored in the Zone 4 server 829 is, in the case of single transactions, parts of track data (never full track data) (e.g., remnants that authorization and settlement processes leave after attempting to mask the data); a plaintext copy of the MID; and the PAN, with its digits in-between the first 6 and the last 4 being encrypted by means of an FPE algorithm, and with the remaining digits of the PAN (i.e., the first 6 and the last 4) being in plain text. With respect to track data, the exemplary embodiment keeps this in two fields within the back-end database. One field is the encrypted data. The other field is the masked data. This provides an advantage in that 90% of back-end look-ups can be performed based on the first six and the last four digits of a PAN. Thus, by storing a field of masked data that is only the clear text for the first six and last four PAN digits, data base searches can, in the majority of cases, be performed without having to sift through encrypted data (i.e., decrypting the data to determine whether it matches search parameters).

The batch data 837 stored in the Zone 4 server 829 includes, for each transaction included in the batch, the PAN, with its digits in-between the first 6 and the last 4 being encrypted by means of an FPE algorithm, and with the remaining digits of the PAN (i.e., the first 6 and the last 4) being in plain text.

To further enhance the reader's appreciation for various aspects of embodiments consistent with the invention, an exemplary Application Program Interface (API) will now be described. The exemplary API is suitable for use in a Zone 1 device 1, and would be used by, for example, payment application software 231 such as that depicted in FIG. 2. It is stressed that this is a non-limiting example; those of ordinary skill in the art will readily be able to implement many different alternative embodiments based on the principles set forth throughout this description and figures.

12. Introduction

12.1. API Description Overview

This exemplary interface is suitable for enabling a point of sale (POS) vendor to implement the end to end model on a given Zone 1 device. Function/parameter names and types are suggestions as the POS hardware vendor may have a specific naming convention that we can adapt to. C is the target programming language for the API.

A high level explanation of the objectives of the exemplary API and how encrypted card data is managed follows.

12.2. Zone 1 Terminal Overview

This section describes at a high level end-to-end encryption ("E3") features at a terminal.
- The terminal generates a 128 bit key for AES encryption of card/track/MID data.
- IBE (Identity Based Encryption) is utilized to encrypt the AES key for transmission to the HPS host.
- Prior to each batch starting, the terminal generates a new AES key and encrypts this key using IBE. The resulting Key Transmission Block is stored by the terminal for transmission on each authorization and the batch upload.
- The same AES key is utilized for all transactions in a single batch. This is done (in part) because the batch upload requires transmission of all encrypted PANs for a given batch. The process is significantly optimized by utilizing the same key for all PANs in a single batch.
- The Merchant ID (MID) is also encrypted to discourage the ability of sniffers to scope transaction traffic and find good MIDs.
- Key variants are utilized so card number/track encryption and data encryption (used for encrypting the MID) do not utilize the same keys. The base encryption key must be persistent across power cycles.
- PCI and PCI PED rules must be adhered to by a hardware vendor that implements the solution described herein.
- Key generation and roll (i.e., change) is 100% under control of the POS application. At no time does the firmware make a decision to roll the key.
- Access to an accurate real-time clock is necessary for IBE to work properly. The current date is used as an input into the IBE encryption.

12.3. Card Swipe Credit Card Transaction Overview

Card swipe occurs at the POS and all data flows through a TRSM.
The POS application gets the following information from the card swipe:
  Encrypted Base 64 format track data (used for authorization)
  Encrypted FPE format PAN (used for settlement upload)
  Masked track data (used for receipts, expiration date checking, etc.)
  Luhn check indicator (used for basic card number validation at POS)
In addition, the implementing entity's Merchant ID (MID) is encrypted prior to transmission.
Note: Because the swiped PAN is unavailable to the application, the OS needs to hold onto it and use it for possible later personal identification number (PIN) entry encryption.

12.4. Manually Keyed Credit Card Transaction Overview

It is desirable to apply PCI PED PIN entry requirements to manually entered card numbers, (i.e., the manually entered card numbers are secured and inaccessible to software). This is similar to how PIN entry is protected. A typical flow follows:
  Manual entry begins at the POS and all input flows through a TRSM.
  POS OS takes over control of the display and keyboard until the entry completes or is cancelled.
  The POS application gets the following information from the manual entry:
    Encrypted FPE format PAN (used for settlement upload)
    Masked PAN (used for receipts, reports, etc.)
    Luhn check indicator (used at POS to validate the keyed number)
  POS application encrypts the MID and sends a message to the implementing entity's host containing encrypted track data, encrypted MID, and KTB.
Note: Because the swiped PAN is unavailable to the application, the OS needs to hold onto it and use it for possible later PIN entry encryption.

13. Magnetic Stripe Reader API

13.1. Overview

It is important for end to end encryption that the application does not have the ability to access raw account data for credit cards, specifically the PAN (primary account number). The underlying operating system must protect this data so that it can never be accessed by the application(s) if the card swipe occurred in a secure mode.

The following set of operations is proposed in an exemplary embodiment to support these requirements.

13.2. Start Card Swipe

Starting a card swipe means the card reader will be opened for reading and the next card swipe will be encrypted. The card swipe is only accessible via E3PollGetCardSwipe.
Example usage: fd_msr=E3StartCardSwipe( );
Opening the MSR in "E3" mode (i.e., a mode of operation of "End-to-End Encryption", meaning encryption at least throughout zones 1 through 4, and preferably throughout zones 1 through 5) should encrypt subsequent card swipes until this mode is closed.

It is necessary to maintain support for non-encrypted card swipes for non-payment card applications and features. This means that there needs to be a way to open the MSR in non-E3 mode.

13.3. Poll Get Card Swipe

The operating system will provide the encrypted data or the encrypted PAN from the requested track. This is based on the previously read card after an open.
Note: The operating system must still retain the raw data after this call to support PIN encryption.
res=E3PollGetCardSwipe (E3CardData CardData[3]);
The return value is a Boolean where false indicates that there is no card data and true indicates a card was swiped. Once a card is swiped, all swipes up until the next open/close cycle should be rejected. Otherwise, an unexpected swipe could get used for PIN encryption. The scenario we wish to avoid is this:
  Card A is swiped at reader
  Amount is entered
  Card B is swiped at the reader for some reason (e.g., customer thinks he or she should swipe a loyalty card)
  PIN is entered and encrypted Card B is used to encrypt the PIN block rather than Card A CardData is an array of card data structures, one for each track. The E3CardData structure contains the following information:

bool present—A boolean value indicating if the track was readable bool luhn—A boolean value indicating if the PAN on the track passes a Luhn check char *encTrack—The NULL-terminated RFC1113 Base64 encoded encrypted data for the track.

Start and end sentinels are not included in the encryption.

The track 1 format code is included.

Base 64 encoding is applied after the track has been encrypted.

char *encryptedPAN—The NULL-terminated FPE PAN for the requested track. This is assumed to be <=25 characters char *maskedTrack—The NULL-terminated data for the track with the middle portion of the PAN masked with asterisks. Start and end sentinels are removed. The track 1 format code is part of the data.

Checking PollGetCard and PollGetManualEntry allows the application to support a prompt screen where a card can be swiped or keyed.

IMPORTANT: If a card is swiped, manual entry should be cancelled. If manual entry keying begins, card swipe should be cancelled.

13.4. Close E3 MSR

This will cause the OS to flush its copy of the card read data and allow other starts to occur.

Example usage: if (fd_msr>=0) E3CloseCardSwipe (fd_msr);

13.5. Get PIN

For PIN Debit, EBT and Stored Value transactions the operating system needs to provide a function that will create the PIN block based on the last read card. This function should start the input and control the display and keyboard. The application does not have the cleartext PAN available so the operating system needs to have cached this from the last card swipe; the PAN is used to generate the encrypted PIN block.

res=E3GetPIN(int displayrow, int displaycol, int inputrow, int inputcol, char * prompt, int timeout, int track);

The screen will be cleared on call and no access to keyboard or display can be done by any application while this in effect.

The return value will indicate the following

Timeout—user did not complete entry in time

Cancel—The user pressed cancel

OK—The PIN Block value is valid

Error—The call failed

If the return value is not OK then the contents of PINblock are undetermined.

The parameters are as follows:

displayrow—This represents the line to display the prompt on.

displaycol—This represents the column to display the prompt on.

inputrow—This represents the line to display *'s on input. It must not overwrite the display row.

inputcol—This represents the column to display the *'s on input. It is restricted to not allow overwrite of the display area and it must always allow at least 12 digits for input on the assigned input row.

prompt—The prompt to show for input. This prompt can be a predefined value in the security chip. This prompt can include line breaks. NULL should use a default prompt (for example Enter PIN).

timeout—After this value (in seconds) the input dialog will abort.

track—Indicates which track's PAN should be used when creating the PIN block.

Note: There should be a limit to the number of times this can be called on a time basis to avoid the possibility of PIN crack attempts.

14. Manual Card Entry

14.1. Overview

Manual card entry is treated similar to a PIN Entry request, in that keyboard entry is secured. The operating system will retain the data and behave as described below.

14.2. Start Manual Entry

For Credit, EBT and Stored Value transactions the operating system needs to provide a function that will allow entry of a manual card. This function should start the input, clear the screen, and take control of the display and keyboard but not block waiting for the user. The poll command in the next section will deal with this.

Once entry begins, the card number is visible as it is entered.

res=E3StartManualEntry(int displayrow, int displaycol, int inputrow, int inputcol, int direction);

The return value will indicate the following. Error codes may be extended as needed:

OK: Input has started

In Progress: Input has already been requested to be started

Not Allowed: Some other reason prevents calling, such as PIN entry in progress.

Invalid Row: Invalid row was passed in.

Invalid Col: Invalid column was passed in.

No access to keyboard or display can be done by any application after this call is issued to get manual card entry. The same restrictions for obtaining a PIN are applicable.

The operating system must retain this data for subsequent calls. The parameters are as follows:

display row: This represents the line to display the prompt on. it is restricted to not allow overwrite of the input area.

displaycol: This represents the column to display the prompt on. it is restricted to not allow overwrite of the input area.

inputrow: This represents the input row timeout: After this time (in seconds) the input dialog will automatically stop (see poll next)

direction: Indicates whether keyed entry occurs left to right or right to left.

14.3. Poll Get Manual Entry

To allow the application to perform background tasks the previous call will not block. This call will allow the application to retrieve the NULL-terminated ASCII card number masked with '*' except for first 6 and last 4 digits. A boolean value will indicate if the keyed value passes a Luhn check.
res=E3PollManualEntry(char * maskedPAN, char *encryptedPAN, bool *Luhn)

The return value will indicate the following. Error codes may be extended as needed:
OK: The PAN value is valid
Timeout: The user did not complete entry in time
Cancel: The user pressed cancel
Error: No PAN Entry in progress
No Data: Still in progress If the return value is not OK then the contents of the return values are undefined.

Note: Checking PollGetCard and PollGetManualEntry allows the application to support a prompt screen where a card can be swiped or keyed.

If a card is swiped, manual entry should be cancelled. If manual entry keying begins, card swipe should be cancelled.

15. Generic Functions

15.1. Overview

The following functions are allowed in all cases.

15.2. E3 Initialization

This function would normally be called by the E3 application (e.g., the payment application software 231) at bootup. Its purpose is to initialize any internal variables/structures used for E3 processing.
res=E3Init(bool *KeyPresent);

KeyPresent indicates whether a cached key could be retrieved or not. If a key cannot be retrieved, it is not necessary for a new one to be generated by the function.

The return value is an enum indicating if the initialization succeeded (OK, FAIL, etc.).

15.3. Flush Card Data

If the application calls this function then all retained E3 data, either manual or swipe, will be flushed.
void E3FlushCardData();

15.4. AES Key Roll

This call will cause the security device to update its internal AES key. It is preferred that this call be made whenever a new batch is opened.
res=E3KeyRoll(void);

The return value should indicate if the rollover was successful or not, by an enum if reasons can be determined. If the call fails then all E3 keys should be scrubbed, so the terminal can no longer be used for transactions without an update.

The call failing would typically be indicative of a hardware failure. It is wished to prevent a scenario where the key does not actually roll successfully and the same key is reused over and over unbeknownst to the software.

15.5. Get E3 KTB

This call generates a KTB (Key Transmission Block) that is transmitted by the application to the implementing entity's host on each authorization and batch upload.

The KTB is typically only generated once per batch; it does not need to change until a key roll occurs. The generation of the KTB is time-intensive so the application typically stores this in a file until a key roll. The KTB is the IBE encrypted AES key.

There is a date component of the KTB encryption that should be managed by the API call.
E3GetKTB (uchar *BBParms, int BBParmsSize, unsigned char identityString, unsigned char *KTB);

The parameters are as follows:
BBParms: Public parameters used to create the KTB
BBParmsSize: Size (in bytes) of the public parameters data
identityString: Null-terminated identity string used for the KTB generation
KTB: Null-terminated representation of the KTB using Base64 character set

15.6. E3 Encrypt Data

This is a generic call to encrypt data under the current Kpos. The intended use is for values like Merchant ID. It will return a format preserving value. This will use the data key for encryption.
res=E3EncryptData (const void *input, int length, void *output, int outsize, int *outlen, int mode);

The return value is a boolean value indicating that the output is valid (true) or not (false).

The parameters are:
input: A binary data block
length: The length of the input block
output: A binary block encoded as required by mode under the current Kpos key
outsize: Size of the output buffer
mode: Base64 (RFC1113) or FPE encoding

15.7. BBParameters Update

This call will update the public settings used in IBE encryption. Typically this is used at application bootup to load the settings from a file. Once loaded, the settings should be in use until changed.
res=E3 (void *data, int datalen);

The return value is an enum indicating if the update succeeded (OK, FAIL, etc.).

The invention has been described with reference to particular embodiments. However, it will be readily apparent to those skilled in the art that it is possible to embody the invention in specific forms other than those of the embodiment described above.

For example, in the various embodiments described above, the Zone 1 terminals (merchant devices) each utilize a symmetric key to encrypt the sensitive information. It is the merchant device-specific symmetric key that, in encrypted form, is included in the key transmission block. However, the use of symmetric keys for this purpose is not essential to the invention, and alternative embodiments can employ other types of keys (e.g., asymmetric keys). Thus, more generally, the Zone 1 terminal can be considered to encrypt its sensitive data by means of a merchant device-specific encrypting key, and to pass an encrypted copy of the merchant device-specific decrypting key to the Zone 2 server in the key transmission block. For the special case in which a symmetric key is used, the merchant device-specific encrypting key and merchant device-specific decrypting key are the same. However, they will be different from one another when asymmetric keys are used.

Also, in the above described embodiments, the host keys have been exemplified by symmetric keys. However, the use of symmetric keys is not essential to the invention and there is no reason why asymmetric keys could not be used in alternative embodiments.

In still other alternatives, the above described exemplary embodiments utilize asymmetric keys, obtained by means of Identity Based Encryption, for the purpose of deriving keys for encrypting (at the merchant device side) the merchant device-specific decrypting key, and for decrypting (at the Zone 2 server side) the encrypted merchant device-specific decrypting key. However, this is not an essential aspect of the invention, and in alternative embodiments keys associated with the Zone 2 server can be distributed in other ways. For example, Zone 2 servers can directly communicate an asymmetric public key to Zone 1 terminals, and then use their asymmetric private key, either directly or indirectly by deriving another private key, to decrypt the encrypted merchant device-specific decrypting key.

In yet other alternative embodiments, it is unnecessary to communicate a key transmission block with each transaction. Instead, key transmission blocks can be communicated only when the merchant device-specific decrypting key has changed. Until that happens, the Zone 2 terminal relies on the merchant device-specific decrypting key obtained by means of the most recently received key transmission block.

Figure 9:
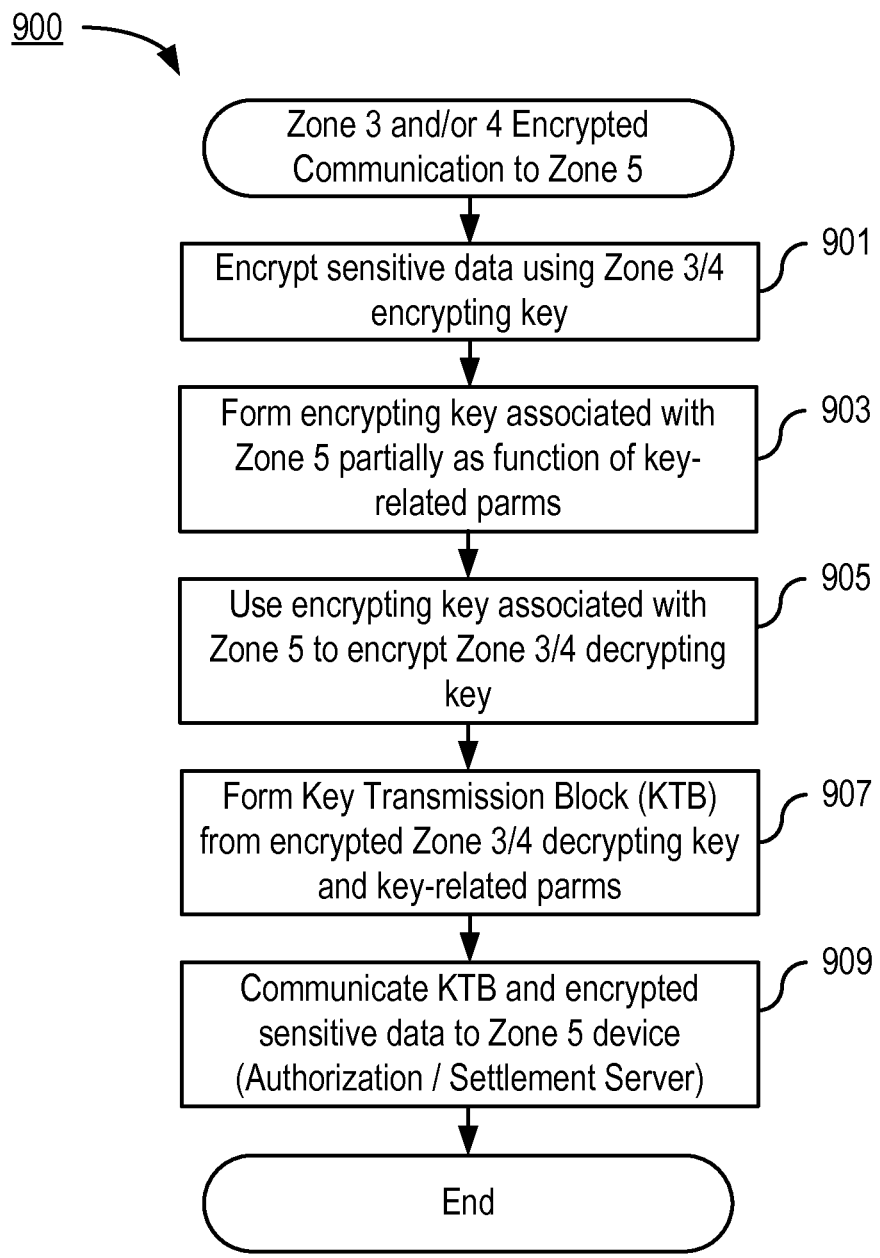
FIG. 9 is an exemplary flow diagram of steps/processes performed by an alternative embodiment of either one of Zone 3 and Zone 4 servers.

In still other alternative embodiments, encrypted data can be provided from either or both of Zones 3 and/or 4 to a Zone 5 device (e.g., an authorization/settlement server, typically not under the control of the implementing entity) in a manner similar to that which is used to communicate encrypted transaction data from a Zone 1 terminal to a Zone 2 terminal. A flow diagram of steps/processes performed by either of the Zone 3 or 4 servers 600, 700 is depicted in FIG. 9. These steps can be carried out by, for example, the various circuit elements associated with these servers. In another aspect, FIG. 9 can alternatively be considered to schematically depict various means 900 for performing the defined functions of either one of a Zone 3 or Zone 4 server 600, 700 in accordance with an exemplary embodiment consistent with the invention.

Referring now to FIG. 9, the Implementing Entity's Zone 3 and/or Zone 4 server encrypts the data using one of its own encrypting keys (step 901). The Zone 3 and/or Zone 4 server encrypts a copy of the corresponding decrypting key that will be needed to decrypt the encrypted data (step 905). (Where symmetric keys are used, the encrypting key is the same as the decrypting key.) To perform this encryption, the Zone 3 and/or 4 server uses an encrypting key associated with the Zone 5 device. (For example, IBE encrypting techniques may be utilized to obtain the necessary encrypting key.) The encrypted decrypting key is then included in a key transmission block that includes at least the encrypted Zone 3/4 decrypting key step (907). If the encrypting key associated with the Zone 5 device is derived, at least in part, from one or more parameters (step 903), then these parameters are also included in the key transmission block. The encrypted data along with the key transmission block are then communicated to the Zone 5 device (step 909). On the receive side, in a manner similar to how a Zone 2 device obtains the decrypting key necessary to decrypt encrypted transaction data received from a Zone 1 terminal, the Zone 5 device, if necessary, derives its own decrypting key based at least in part on the one or more parameters included in the key transmission block. The Zone 5 device then decrypts the encrypted Zone 3/4 decrypting key. The decrypted Zone 3/4 decrypting key is then used to decrypt the encrypted data.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of securely communicating data in a communication network, the method comprising:
   a gateway device receiving a key transmission block from a first device, wherein the key transmission block includes an encrypted copy of a first device-specific decrypting key and one or more key-related parameters;
   the gateway device using the one or more key-related parameters to derive a decrypting key that is associated with the gateway device;
   the gateway device using the decrypting key that is associated with the gateway device to decrypt the encrypted copy of the first device-specific decrypting key;
   the gateway device receiving first encrypted transaction data from the first device, wherein the first encrypted transaction data is encrypted by means of a first device-specific encrypting key;
   the gateway device producing decrypted transaction data by using the first device-specific decrypting key to decrypt the first encrypted transaction data;
   the gateway device deriving second encrypted transaction data from at least a portion of the decrypted transaction data, wherein the second encrypted transaction data is encrypted by means of a host-specific encrypting key; and
   the gateway device communicating the second encrypted transaction data to another host device.

2. The method of claim 1, wherein the decrypting key associated with the gateway device is an asymmetric private key of the gateway device.

3. The method of claim 1, wherein the first device-specific encrypting key is the same as the first device-specific decrypting key.

4. A gateway server for securely communicating data in a communication network, the gateway server comprising:
   circuitry configured to receive a key transmission block from a first device, wherein the key transmission block includes an encrypted copy of a first device-specific decrypting key and one or more key-related parameters;
   circuitry configured to use the one or more key-related parameters to derive a decrypting key that is associated with the gateway server;
   circuitry configured to use the decrypting key that is associated with the gateway server to decrypt the encrypted copy of the first device-specific decrypting key;
   circuitry configured to receive first encrypted transaction data from the first device, wherein the first encrypted transaction data is encrypted by means of a first device-specific encrypting key;
   circuitry configured to produce decrypted transaction data by using the first device-specific decrypting key to decrypt the first encrypted transaction data;
   circuitry configured to derive second encrypted transaction data from at least a portion of the decrypted transaction data, wherein the second encrypted transaction data is encrypted by means of a host-specific encrypting key; and circuitry configured to communicate the second encrypted transaction data to another server of the communication network.

5. The gateway server of claim 4, wherein the decrypting key associated with the gateway server is an asymmetric private key of the gateway server.

6. The gateway server of claim 4, wherein the first device-specific encrypting key is the same as the first device-specific decrypting key.

* * * * *